United States Patent [19]
Tokioka et al.

[11] Patent Number: 5,805,147
[45] Date of Patent: Sep. 8, 1998

[54] COORDINATE INPUT APPARATUS WITH CORRECTION OF DETECTED SIGNAL LEVEL SHIFT

[75] Inventors: Masaki Tokioka, Fujisawa; Atsushi Tanaka, Yamato; Yuichiro Yoshimura, Kamakura; Ryozo Yanagisawa, Inba-gun; Katsuyuki Kobayashi; Hajime Sato, both of Yokohama, all of Japan

[73] Assignee: Canon Kabushiki Kaisha, Tokyo, Japan

[21] Appl. No.: 632,583

[22] Filed: Apr. 15, 1996

[30] Foreign Application Priority Data

Apr. 17, 1995 [JP] Japan .................................... 7-090594

[51] Int. Cl.[6] .............................. G09G 3/02; G08C 21/00
[52] U.S. Cl. ......................... 345/173; 345/177; 345/179; 178/18; 178/19
[58] Field of Search .................................. 178/18, 19, 20; 345/173, 176, 177, 179

[56] References Cited

U.S. PATENT DOCUMENTS

| | | | |
|---|---|---|---|
| 4,568,799 | 2/1986 | Kobayashi et al. | 178/19 |
| 4,886,943 | 12/1989 | Suzuki et al. | 178/18 |
| 4,897,510 | 1/1990 | Tanaka et al. | 178/18 |
| 4,910,363 | 3/1990 | Kobayashi et al. | 178/18 |
| 4,931,965 | 6/1990 | Kaneko et al. | 364/560 |
| 5,017,913 | 5/1991 | Kaneko et al. | 340/712 |
| 5,070,325 | 12/1991 | Tanaka et al. | 340/706 |
| 5,097,102 | 3/1992 | Yoshimura et al. | 178/18 |
| 5,097,415 | 3/1992 | Yoshimura et al. | 345/177 |
| 5,239,138 | 8/1993 | Kobayashi et al. | 178/18 |
| 5,253,187 | 10/1993 | Kaneko et al. | 178/19 |

*Primary Examiner*—Steven J. Saras
*Assistant Examiner*—Vijay Shankar
*Attorney, Agent, or Firm*—Fitzpatrick, Cella, Harper & Scinto

[57] ABSTRACT

With the use of transfer delay of supersonic wave, an apparatus for measuring a distance and inputting coordinates accurately is implement. When a distance is measured with the use of the transfer of supersonic wave, the transfer delay time is measured at the specified portion of a detected signal. The position of the specified portion to be measured may shift due to the level of the detected signal or noise. The signal obtained by delaying the specified time the envelope of the detected signal is generated. The signal obtained by attenuating the envelope at the specified rate and adding the specified offset is also generated. A gate signal is formed by obtaining the differential of these two generated signals. The delay time is measured during the gate period. With this configuration, the gate-period timing is immune to influences of the signal level and noise, providing highly precise coordinate inputs.

22 Claims, 20 Drawing Sheets

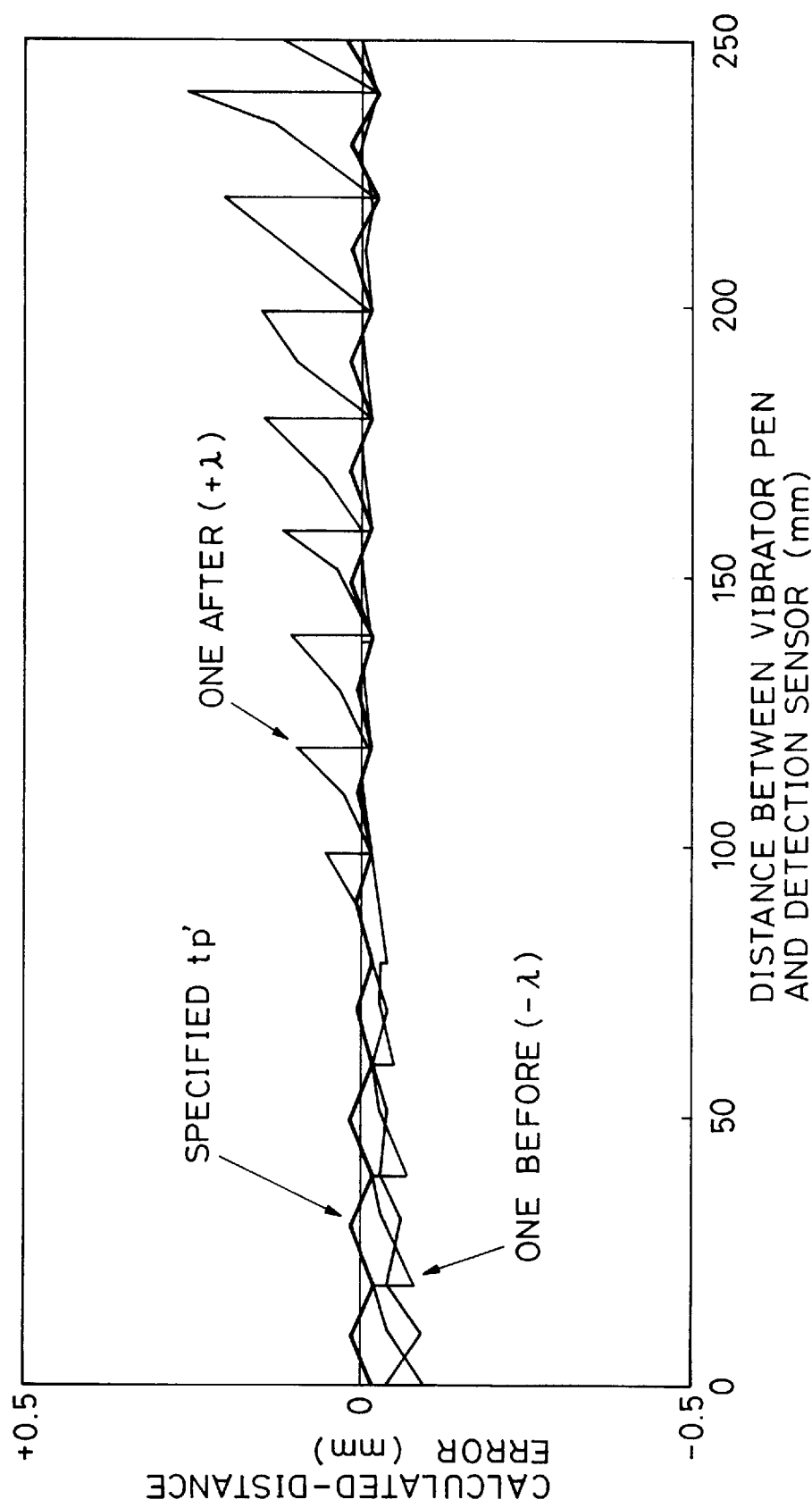

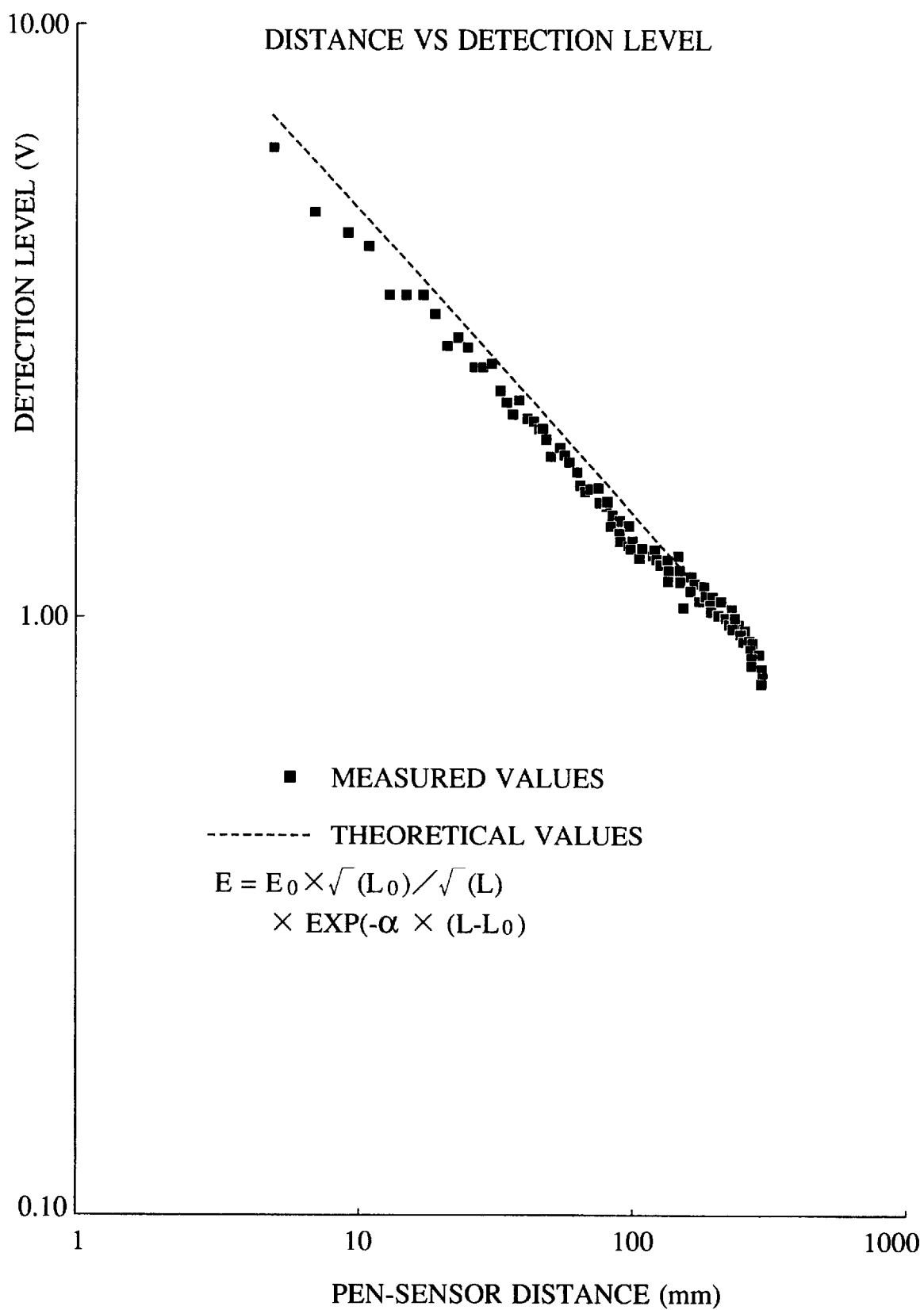

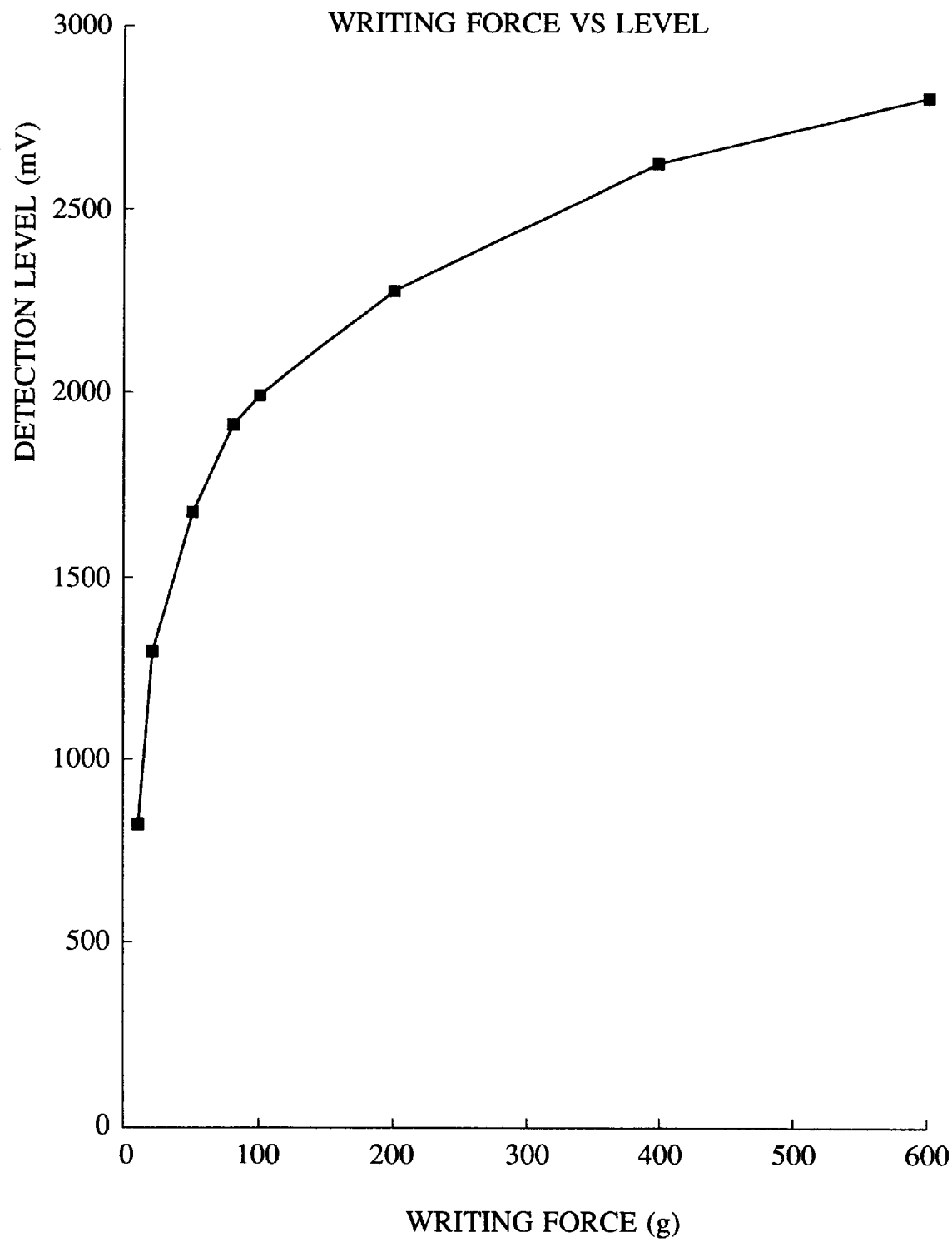

COORDINATE INPUT APPARATUS WITH CORRECTION OF DETECTED SIGNAL LEVEL SHIFT

BACKGROUND OF THE INVENTION

1. Field of the Invention

The present invention relates to coordinate input apparatuses, and more particularly, to a coordinate input apparatus in which elastic-wave vibration input by a vibrator pen is detected by a plurality of sensors provided for a vibration transfer plate and the coordinates of the point where the vibration is input by the vibrator pen is detected according to the transfer time of the elastic-wave vibration input to the vibration transfer plate from the vibrator pen.

2. Description of the Related Art

A supersonic-method coordinate input apparatus employs a method in which position coordinates are calculated by detecting the delay time of wave transferred on a tablet serving as an input surface. Since the tablet does not have special configurations, such as matrixed wiring, the apparatus can be inexpensive. When a transparent plate glass is used for a tablet, the apparatus provides higher transparency than those using other methods.

FIG. 2 is a block diagram showing an outlined configuration of a conventional supersonic-method coordinate input apparatus. In FIG. 2, a calculation control circuit 1 calculates coordinates as well as controls the whole apparatus. A vibrator driving circuit 2 vibrates the tip of a vibrator pen 3. A vibration transfer plate 8 is made of a transparent member such as an acrylic plate or a glass plate. The coordinates of a point is input with the vibrator pen 3 by touching the vibration transfer plate 8. In other words, by specifying a point in area A enclosed by a solid line (hereinafter called the effective area) with the vibrator pen 3, the coordinates of the point are calculated.

A vibration-proof member 7 is provided at the peripheral of the vibration transfer plate 8 in order to prevent (reduce) reflection wave from returning to the center after transferred wave is reflected at an end face of the vibration transfer plate 8. Vibration sensors 6a to 6d for converting mechanical vibration to electric signals, such as piezoelectric elements, are secured at the vicinity of the inside of the vibration-proof member 7. A signal-waveform detection circuit 9 outputs the signals detected by the vibration sensors 6a to 6d. A display 11 capable of displaying in dot units, such as a liquid-crystal display, is disposed at the back of the vibration transfer plate. A dot is displayed at the position where the vibrator pen 3 touches, by the drive of a display driving circuit 10, enabling the operator to see the dot through the vibration transfer plate 8 (made of a transparent member).

The vibrator 4 built in the vibrator pen 3 is driven by a vibrator driving circuit 2. The calculation control circuit 1 supplies a low-level pulse signal to the vibrator driving circuit 2 and the vibrator driving circuit 2 amplifies it at the specified gain and applies to the vibrator 4 as a driving signal. The electrical driving signal is converted to mechanical vibration by the vibrator 4 and the vibration is transferred to the vibration transfer plate 8 through the pen tip 5.

The vibration frequency of the vibrator 4 is selected such that lamb wave is generated on the vibration transfer plate 8 such as a glass plate. Efficient vibration conversion is possible by setting the vibration frequency of the vibrator 4 to the resonant frequency of the vibrator 4 and the pen tip 5. As described above, elastic wave transferred on the vibration transfer plate 8 is lamb wave and has an advantage of being not susceptible to influences of scratches or obstacles on the surface of the vibration transfer plate, compared with surface wave.

The calculation control circuit will be described below.

With the above-described configuration, the calculation control circuit 1 outputs a signal for driving the vibrator driving circuit 2 and the vibrator 4 in the vibrator pen 3 at the specified interval (5 ms for example), and starts counting the time with its internal timer (comprising a counter). Vibration generated by the vibrator pen 3 is transferred on the vibration transfer plate 8 and reaches the vibration sensors 6a to 6d with delays determined by the distances to the sensors.

The signal-waveform detection circuit 9 detects the signal from each of the vibration sensors 6a to 6d and generates a signal indicating the vibration-reach timing to each of the vibration sensors with waveform detection processing which will be described later. The signal-waveform detection circuit 9 inputs the signal corresponding to each sensor to the calculation control circuit 1. The calculation control circuit 1 detects the vibration reach time to each of the vibration sensors 6a to 6d, drives the display driving circuit 10 to control the display 11 according to the positional information of the vibrator pen 3, and outputs the coordinates to an external unit through serial or parallel communication (not shown).

FIG. 3 is a block diagram showing an outlined configuration of the calculation control circuit 1. The sections composing the calculation control circuit 1 and outlined operations thereof will be described below.

In FIG. 3, a microcomputer 31 for controlling the calculation control circuit 1 and the whole coordinate input apparatus, comprises internal counters, ROM storing processing procedures, RAM used for calculation and other purposes, and nonvolatile memory for storing constants and others. A timer 33 (comprising counters, for example) for counting the not-shown reference clock starts measuring the time when a start signal which directs the vibrator driving circuit 2 to start driving the vibrator 4 in the vibrator pen 3 is input. With this configuration, the start of measuring the time and the vibration detection by the sensors are synchronized, enabling the delay time obtained until the vibration is detected by the sensors (6a to 6d) to be measured.

The other sections composing the calculation control circuit 1 will be described later.

The vibration reach timing signals from the vibration sensors 6a to 6d output from the signal-waveform detection circuit 9 are input to latch circuits 34a to 34d through the detection-signal input port 35. The latch circuits 34a to 34d correspond to the vibration sensors 6a to 6d respectively. When a latch circuit receives the timing signal from the corresponding sensor, it latches the measured time from the timer 33. When the determination circuit 36 determines that all detection signals are received, it outputs the signal indicating the situation to the microcomputer 31. Receiving this signal from the determination circuit 36, the microcomputer 31 reads from the latch circuits the vibration reach time to each of the vibration sensors, and performs the specified calculation to find the coordinates of the vibrator pen 3 on the vibration transfer plate 8. If the microcomputer 31 outputs the calculated coordinate information to the display driving circuit 10 through the I/O port 37, a dot or other symbols can be displayed at the corresponding position on the display 11. The coordinates can also be output to an external unit by outputting the coordinate information to the interface circuit through the I/O port 37.

The principle for measuring vibration reach time from the vibrator pen 3 to the vibration sensors 6a to 6d will be described next by referring to FIGS. 4 and 5.

FIG. 4 shows the waveform of detection signals input to the signal-waveform detection circuit 9. It is also used for explaining measurement processing for vibration reach time. In the following descriptions, the vibration sensor 6a will be taken as an example. The same descriptions apply to the other vibration sensors 6b, 6c, and 6d.

It has been already described that the measurement of the vibration reach time to the vibration sensor 6a starts at the same time when a start signal is output to the vibrator driving circuit 2. At this time, the vibrator driving circuit 2 applies a drive signal 41 to the vibrator 4. With this signal 41, supersonic vibration transferred from the vibrator pen 3 to the vibration transfer plate 8 proceeds during time tg corresponding to the distance to the vibration sensor 6a, and is detected by the vibration sensor 6a. The signal detected by the vibration sensor 6a is represented by 42 in the figure. Since vibration used is lamb wave, the phase relationship between the detected signal and the envelope of the signal changes during vibration transfer according to the transfer distance in the vibration transfer plate 8. Let the speed at which the envelope 421 proceeds, that is the group speed, be called Vg, and the speed at which the phase (the zero-crossing point, for example) of the detected signal 42 proceeds, that is the phase speed, be called Vp. If the group speed, Vg, and the phase speed, Vp, are known, the distance between the vibrator pen 3 and the vibration sensor 6a can be calculated from the vibration transfer time.

Using envelope 421, distance "d" between the vibrator pen 3 and the vibration sensor 6a is expressed by the following equation with Vg, which is the speed of envelope 421, and tg, which is the vibration reach time when a certain point on the waveform of envelope 421, for example, the first zero-crossing point of signal 43 obtained by differentiating envelope 421 twice is detected as an inflection point of envelope 421.

$$d = Vg \times tg \quad (1)$$

This equation applies to the vibration sensor 6a. The same equation can be applied to the other vibration sensors 6b to 6d to obtain the distances between the vibrator pen 3 and the sensors.

To determine coordinates more precisely, processing according to the detection of a phase signal is performed. Phase signal 44 is obtained by extracting only certain frequency components from the detected signal 42 with the use of a bandpass filter. Let the time from when vibration is applied, to a certain detected point of phase signal 44, for example, the first zero-crossing point of phase signal 44 after the signal exceeds the specified signal level 441 be called tp' 47 (which can be obtained by comparing phase signal 44 with gate signal 46 having the specified width starting from the time when phase signal 44 exceeds level 441). The distance between the vibration sensor and the vibrator pen is expressed as follows;

$$d = n \times \lambda p + Vp \times tp \quad (2)$$

where tp represents the value obtained by subtracting the delay time caused by circuits and the like from tp', λp is the wavelength of elastic wave, and n is an integer.

Integer n can be expressed as follows from equations (1) and (2).

$$n = int[(Vg \times tg - Vp \times tp)/\lambda p + 1/N] \quad (3)$$

where N is an appropriate real number except 0. When N is set to 2.0, integer n in equation (2) can be determined even if tg or tp having an error of ±½ wavelength or less is obtained. By substituting N obtained in this way into equation (2), the distance between the vibrator pen 3 and the vibration sensor 6a is measured precisely.

Actually measured in the signal-waveform detection circuit 9 are time tg' and time tp' including offsets corresponding to delay time in the vibrator pen 3 and the circuits. These values need to be converted to tg and tp by subtracting the offsets when the values are substituted to equations (2) and (3). To measure these two vibration transfer times, tg' and tp', signals 47 and 49 are generated in the signal-waveform detection circuit 9 which is configured as shown in FIG. 5.

FIG. 5 is a block diagram showing a configuration of the signal-waveform detection circuit 9 of a conventional coordinate input apparatus. In FIG. 5, a signal output from the vibration sensor 6a is amplified by a preamplifier 51 to obtain the detection signal 42. An envelope detection circuit 52 extracts only envelope 421 from the detected signal 42. An inflection-point detection circuit 53 comprising two-stage differential circuits applies differential processing twice to envelope 421 to convert a rising inflection point of the envelope serving as an input signal to the first falling zero-crossing point of the output signal, and outputs twice-differentiated signal 43.

At the same time, phase signal 44 is obtained by removing extra frequency components from the detected signal 42 in a bandpass filter 55.

A signal detection circuit 56 generates pulse signal 45 corresponding to the portions exceeding threshold signal 441 having the specified level (hereinafter called the comparison level), of phase signal 44. A monostable multivibrator 57 forms gate signal 46 having the specified width which is triggered by the first rising edge of pulse signal 45. Gate signal 46 serves as an operation switch for tg comparator 54 and tp comparator 59. tg comparator 54 detects the first falling zero-crossing point (corresponding to a rising inflection point of envelope signal 43 as described above) of twice-differentiated signal 43 in the period while gate signal 46 opens and supplies group-delay reach-time signal tg' 49 to the calculation control circuit 1. tp comparator 59 detects the first rising (or falling) zero-crossing point of the signal obtained by slicing phase signal 44 in a slice circuit 58 (in FIG. 4, phase signal 44 is shown as is because the sliced signal has a small amplitude) while gate signal 46 opens and supplies phase-delay reach-time signal tp' 47 to the calculation control circuit 1.

In this embodiment, to reduce susceptibility to influences of reflected wave, phase-delay reach-time signal tp' 47 indicates the period until the first rising edge. It may indicate the second or subsequent rising edge according to the configuration. The slice circuit 58 just slices the signal in order to reduce the level of an input to tp comparator 59 to the specified level and to make the output characteristics of the comparator stable.

The above-described circuits are used with the vibration sensor 6a. For the other vibration sensors, the same circuits are provided.

Compensation for a circuit-delay time will be described next.

The vibration-reach times latched by the latch circuit include circuit-delay time et and phase-offset time toff. Errors in these times are always included in vibration transfer from the vibrator pen 3 to each of the vibration sensors 6a to 6d through the vibration transfer plate 8.

Assuming that the distance from the origin O to the vibration sensor 6a is R1 (=X/2) as shown in FIG. 6, actual vibration reach times from the origin O to the sensor 6a are tgz' and tpz' when an input is performed at the origin with the vibrator pen 3, and the real reach times from the origin to the sensor are tgz and tpz, the following expressions indicate the relationship between the vibration reach times, and circuit-delay time et and phase-offset time toff.

$$tgz' = tgz + et \quad (4)$$

$$tpz' = tpz + et + toff \quad (5)$$

The same relationships are satisfied for an input performed at point P with measured times tg' and tp' as follows;

$$tg' = tg + et \quad (6)$$

$$tp' = tp + et + toff \quad (7)$$

The following expressions are obtained by subtracting (4) from (6) and (5) from (7).

$$tg' - tgz' = (tg + et) - (tgz + et) = tg - tgz \quad (8)$$

$$tp' - tpz' = (tp' + et + toff) - (tpz + et + toff) = tp - tpz \quad (9)$$

The circuit-delay time et and the phase-offset time toff included in each transfer time are removed, and the differences in the real transfer delay times are obtained according to the distance between the origin O and the input point P, relative to the position of the sensor 6a. With the use of expressions (2) and (3), the distance difference can be obtained.

Since the distance from the origin O to the vibration sensor 6a is stored in nonvolatile memory or the like in advance and known, the distance between the vibrator pen 3 and the vibration sensor 6 can be determined. The positions of the other sensors 6b to 6d can also be determined.

Actually measured times tgz' and tpz' at the origin O are stored in nonvolatile memory when the apparatus is shipped. Expressions (8) and (9) are calculated before expressions (2) and (3) are calculated, enabling precise measurement.

Next, the principle for detecting the coordinates of the point where the vibrator pen 3 is placed on the vibration transfer plate 8 will be described by referring to FIG. 6. When the four vibration sensors 6a to 6d are placed at points S1 to S4 which are in the vicinities of the middle points of the four sides of the vibration transfer plate 8, the distances da to dd between the point P where the vibrator pen 3 is placed to the vibration sensors 6a to 6d in straight lines can be obtained according to the principle described above. Further, according to these distances da to dd, the coordinates, (x, y), of the point P where the vibrator pen 3 is placed can be obtained as follows with the use of Pythagorean theorem.

$$x = (da + db) \times (da - db)/2X \quad (10)$$

$$y = (dc + dd) \times (dc - dd)/2Y \quad (11)$$

where X is the distance between the vibration sensors 6a and 6b, and Y is the distance between the vibration sensors 6c and 6d.

As described above, the coordinates of the point where the vibrator pen 3 is placed can be detected in real time.

However, the conventional signal detection circuit has the following problems in its configuration.

In the signal-waveform detection circuit shown in FIG. 5, the gate signal 46 opens at the timing when the detection signal from the vibration sensor 6 or the signal obtained by applying waveform processing to the detection signal exceeds the specified threshold level 441. If the detection signal of the vibration sensor has a low level, the vibration may not be detected. This problem inevitably takes place when the detection of vibration (determination whether vibration reaches) depends on the detection level of the vibration. There are not a few factors which make a detection level low even when the vibrator pen 3 presses the vibration transfer plate 8. One factor is a small pressure (can be expressed as the writing force in general) applied to the vibration transfer plate 8 by the vibrator pen 3. When a coordinate input apparatus is used for pointing as a pointer, a writing force of 100 g or more is usually applied although there are individual differences. When the writing force is 100 g or more, the detection level changes within a range covering the minimum value to about twice the value. When a stroke input method widely used these days in which characters and figures are input as a set of consecutive coordinates is used, however, a writing force of only several to several-tens grams is used. With such a writing force, since vibration energy input from the vibrator pen 3 to the vibration transfer plate 8 changes largely, the detection level changes within a range covering the minimum value to about ten-times the value due to the writing force. Therefore, threshold 431 needs to be set to low in advance and the dynamic range for detecting the signal needs to be enlarged. To satisfy these conditions, noise, such as EMI noise from the outside, superimposed on the detection signal needs to be suppressed to a low level at the output stage of each circuit block of the signal-waveform detection circuit 9, making the circuits expensive.

When the vibrator pen is slanted, namely, the operator of the coordinate input apparatus holds the vibrator pen slantingly and uses it for inputs, the detection level decreases substantially. In other cases, such as when a material such as acryl having a large vibration-attenuation rate is used for the vibration transfer plate 8, and when the vibration transfer plate 8 is large, since changes in the detection level due to vibration reach distances cannot be ignored, the detection level at which an input is guaranteed needs to be set large in order to assure certain specifications.

Even if whether vibration occurs is determined, to calculate coordinates correctly, there is a problem in the configuration of the conventional signal detection circuit. Expressions (1) to (3) are satisfied when sonic speeds Vg and Vp are constant. In practice, however, when lamb wave is used as supersonic wave, lamb wave does not always transfer on the vibration transfer plate 8 at a constant sonic speed. This is because lamb wave changes the sonic speed according to the frequency and the thickness of the vibration transfer plate 8. It is not difficult to use a vibration transfer plate 8 having a thickness which is uniform to some extent, but it is difficult to use vibration having a constant frequency. To generate vibration having a constant frequency electrically, it is necessary to use continuous wave (cw) having a constant frequency electrically as a drive signal. The drive signal 41 needs to be a pulse-shaped short signal in order to increase time resolution because it is used for detecting the vibration transfer time. Since it is a wide-band drive signal, only wide-band vibration (vibration with a plurality of frequency components being mixed) is obtained. The characteristics of the vibrator pen 3 serving as an electroacoustic conversion device is also a problem. When a device having a resonant configuration is created with the vibrator 4, the pen tip 5, and the like, the narrow-band electroacoustic conversion characteristics of the vibrator 4 itself are lost and wide-band characteristics are obtained. In addition, receiving influences of high-order-mode, mechanical resonance, the conversion characteristics of the vibrator pen becomes very complicated and have a plurality of frequency peaks, disabling occurrence of single-frequency vibration.

FIG. 7 shows the frequency characteristics of the signal detected by the vibration sensor 6 from vibration generated by a typical vibrator pen 3. The pulse-repeated frequency of the driving signal 41 is 500 kHz. With the above-described two factors, it is understood that the detected vibration has a plurality of frequencies mixed. FIG. 8 shows the frequency characteristics of the group speed Vg and the phase speed Vp of lamb wave. From the figure, it is found that the vibration actually transfers on the vibration transfer plate 8 at various sonic speeds.

In the conventional coordinate input apparatus, a band-pass filter 55 is used to perform more accurate coordinate calculation processing according to a constant sonic speed by obtaining a signal having more uniform frequency components. Even in that condition, to obtain more accurate coordinates, the following problem takes place.

When the detection signal in the vibration sensor 6 changes its level, an error in the distance information obtained from expression (3) increases depending on the timing the gate signal 46 opens. This problem is unique to a method in which coordinates are calculated with the simultaneous use of the group-delay time, tg, and the phase-delay time, tp. It is obvious that the position of tp' shown in FIG. 4 goes back and forth by one wavelength depending on the timing the gate signal 46 opens. In other words, when the detection level decreases, the gate signal 46 opens late, the next zero-crossing point in phase signal 42 is detected as tp'. When the detection level increases, the zero-crossing point one before is detected. When Vg and Vp are constant, even if tp' changes, it is obvious from expression (3) that the correct distance is obtained. As described above, if vibration has a plurality of frequency components (a plurality of sonic speeds), an error occurs. FIG. 9 shows errors in the distances obtained using the specified tp' and those one after and one before the specified one. As understood from FIG. 9, it is preferable that the position of tp' does not go back or forth in order to reduce a distance error and an error in the obtained coordinates. In practice, it has been understood that the most stable (least distance error) condition is obtained by setting a zero-crossing point which always has a constant positional relationship with the peak of phase signal 42 to tp'. With this configuration, the value of n obtained from expression (3) becomes constant. Among a plurality of frequency components, there is a certain central component (500 kHz) and the change (relationship between the transfer distance and the delay time) of phase signal 42 near the peak is equivalent to a vibration of 500 kHz. Therefore, it is considered that this is because the vibration can be regarded as that having a constant frequency if the relative position from the peak of phase signal 42 is fixed (n is constant).

As described above, in the supersonic-method coordinate input apparatus in which vibration is detected depending on the detection level of the vibration, the signal-waveform detection circuit 9 having a large dynamic range is required in order to assure a use range in which an input is enabled, making the apparatus expensive. In the method in which coordinates are calculated accurately with the use of the group-delay time and the phase-delay time, the range of the detection level becomes narrow, reducing the use range (such as the size of the effective area in the transfer member, the writing force, and the pen angle).

FIGS. 10 and 11 show influences of the transfer distance and writing force, which are typical factors in changes of the detection level of the vibration sensor 6. FIG. 10 illustrates the relationship between the distance from the vibrator pen to the vibration sensor, and the detection level. FIG. 11 illustrates the relationship between the writing force and the detection level. It has been demanded these days that an electronic device is compact and a coordinate input apparatus is also compact accordingly, requiring that the size of effective area A shown in FIG. 2 approaches that of the vibration transfer plate 8. In FIG. 10, when the distance between the pen and the sensor is short, the level increases rapidly. The shorter the minimum coordinate-input distance becomes, namely, the more compact the coordinate input apparatus becomes, the larger dynamic range is required for the signal-waveform detection circuit. As shown in FIG. 11, when the wiring force is 100 g or less, the detection level changes rapidly, requiring a large dynamic range. Between the condition in which the pen is used at 90 degrees (the pen is hold perpendicularly to the plate) and the condition in which the pen is used at 60 degrees (not shown the figures), there is a two-times difference in the detection level. To allow the operator to input coordinates in a natural manner, a margin corresponding to the two-times detection-level difference or more is required in the detection level since the operator may hold the pen at an angle equal to 60 degrees or lower.

FIG. 12 shows a signal-waveform detection circuit which increases the detection-level range in which coordinate-inputs are available without increasing the circuit dynamic range in the conventional supersonic-method coordinate input apparatus. By referring to waveform-processing procedures shown in FIG. 13, the principle of the conventional technique for measuring a vibration transfer time will be described below.

Signal 43 obtained by differentiating twice the envelope signal, which is input to the tg comparator 54, has disturbance noise mixed before a vibration reaches. It cannot be said that signal 43 is a constant zero-level signal. Therefore, to prevent a tg' signal being created erroneously by noise, it is preferable that the tg comparator 54 is idle until a vibration reaches. In the same way as when the gate signal of the conventional technique is used for tp' detection, gate signal 462 output from the monostable multivibrator 57 is used for tg' detection. In other words, two vibration transfer times, tg' and tp', are calculated with the use of the gate signal. The conventional technique features the opening of the gate signal, which is used for detecting the two special points stably. Operations of a gate-signal generation circuit 60 shown in FIG. 12 for generating the timing when the gate signal opens will be described by referring to FIG. 13. Envelope signal 421 output from an envelope detection circuit 52 is input to the gate-signal detection circuit 60. The gate-signal detection circuit 60 attenuates the input envelope signal to an appropriate amplitude, and generates a reference-level signal 422 to which a constant offset is added. Also receiving a twice-differentiated signal 43 from an envelope-inflection-point detection circuit, the gate-signal generation circuit 60 takes the difference between the twice-differentiated signal and the reference-level signal 442 and outputs a gate generation signal 452. A monostable multivibrator 56 outputs a gate signal 462 having the specified width at the timing when the input gate generation signal 452 rises.

The tg comparator 54 and the tp comparator 59 perform the same waveform processing as in the conventional apparatus. With this configuration, the gate signal opens at a constant timing irrespective of the detection level. The constant timing means that the gate opens at a certain time before the peak of phase signal 44. When the gate opens with the use of the conventional fixed threshold, if the level of the detection signal 42 of the vibration sensor 6 decreases, the gate signal is delayed. A zero-crossing point of the phase signal 44 after the peak is regarded as tp'. In this case, if the writing force is small or the pen is held extremely slantingly, even when the same coordinates are input, an error in the calculated distance increases. When the detection point one after the specified one is used, an error is about 0.3 mm at a long distance according to an error in the calculated distance shown in FIG. 9. In the same way, if the writing force is large at a short distance, the detection point tp' one before the specified one is used. The error in this case is shown in FIG. 9. The aim of the conventional technique is to make the error in the calculated distance zero.

Even when the conventional technique keeps the tp' detection point at a certain position, there is still the problems described below. First, a comparator operation problem, that is, the differential input voltage rating needs to be designed to be large. In terms of energy saving and an interface to digital signals, it is preferable that the comparator operates with a single power. When the differential input signals (signals 442 and 43) shown in FIG. 13 are input, even if either signal is input to the non-inverted-input terminal, the differential input voltage becomes large in the negative side. In other words, the difference between the reference level signal 442 and the twice differentiated signal 43 is large in the positive and negative sides. Even when phase signal 44 or detection signal 42 is used as a substitute for signal 43, the same phenomenon always takes place. If an input voltage has a large negative amplitude, a negative power is required to be prepared, making the comparator complicated.

A second problem is the time difference between differential input signals. This problem does not occur when the envelope-inflection-point detection circuit 53 has the desired delay time and the twice differentiated signal 43 has the positional (time) relationship shown in FIG. 13 with the reference level signal 442. If the detection signal 43 changes due to wear in the pen tip, or the phase (delay) characteristics of the signal-waveform detection circuit changes due to the temperature, the relative time difference changes, causing malfunction.

When the drive signal 41 is set to a single pulse to forcibly make the time width of the detection signal short, the twice differentiated signal rises earlier than the reference level signal 442, always generating a top-gate generation signal 452. In that case, the same data as when a fixed threshold is used (FIG. 4) is obtained. In other words, it can be said from the viewpoint of generating a stable gate signal 44 that there is a few unstable factors when two signals passing through two different processing paths are used.

SUMMARY OF THE INVENTION

Accordingly, it is an object of the present invention to provide a coordinate input apparatus allowing stable, highly precise coordinate inputs to be performed even if a detection level due to the vibration transfer distance increases, electric noise increases or a detection level fluctuates according to the writing force of each user or the like.

The foregoing object is achieved according to one aspect of the present invention through the provision of a coordinate input apparatus for calculating and outputting the coordinate position directed by a vibration input pen on a vibration transfer plate, according to the vibration transfer plate and the delay time detected at a plurality of points by vibration detection means from the elastic-wave vibration input onto the vibration transfer plate by the vibration input pen, the coordinate input apparatus comprising: standard-signal outputting means for outputting a standard signal according to the signal output from the vibration detection means; reference-signal generating means for converting the standard signal to the reference signal by attenuating the standard signal at the specified attenuation rate and adding the specified offset; time-difference generating means for generating the relative time difference between the standard signal and the reference signal; gate-signal outputting means for outputting a gate signal by detecting a portion where the standard signal having a time difference caused by the time-difference generating means exceeds the reference signal; a first measuring means for measuring a group-delay time according to the delay speed of the vibration by detecting the specified point of the detected signal during the period of the gate signal and by using the specified point as the reference; and providing means for providing the position coordinates of the vibration input means according to the group-delay time measured by the first measuring means.

The foregoing object is also achieved according to another aspect of the present invention through the provision of a coordinate input apparatus for calculating and outputting the coordinate position where elastic-wave vibration is input on a vibration transfer plate, according to the vibration transfer plate and the delay time of the elastic-wave vibration detected by vibration detection means, the coordinate input apparatus comprising: converting means for converting to the level signal by attenuating the envelope of the detected signal detected by the vibration detection means and adding the specified offset; delaying means for delaying the envelope of the detected signal detected by the vibration detection means; and generating means for generating a gate signal by comparing the signal obtained by the converting means and the signal obtained by the delaying means.

BRIEF DESCRIPTION OF THE DRAWINGS

FIG. 9 is a view showing distance errors caused by tp' detection point shifts.

FIG. 10 shows the relationship between vibration transfer distances and detection levels.

FIG. 11 illustrates the relationship between the detection levels and writing forces with a vibrator pen.

DETAILED DESCRIPTION OF THE PREFERRED EMBODIMENTS

First Embodiment

Figure 1:
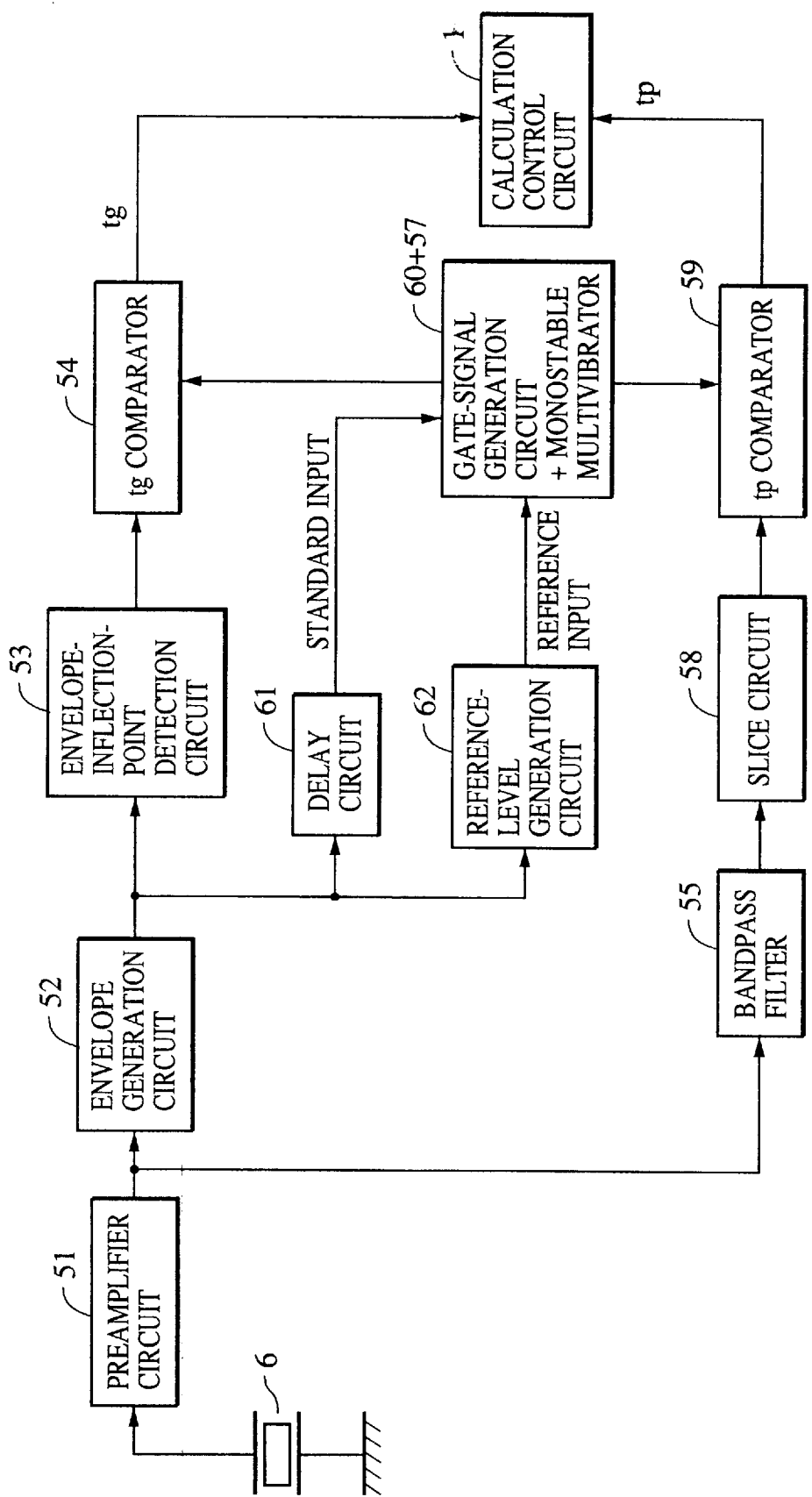
FIG. 1 is a block diagram showing a signal-waveform detection circuit according to a first embodiment of the present invention.
Figure 2:
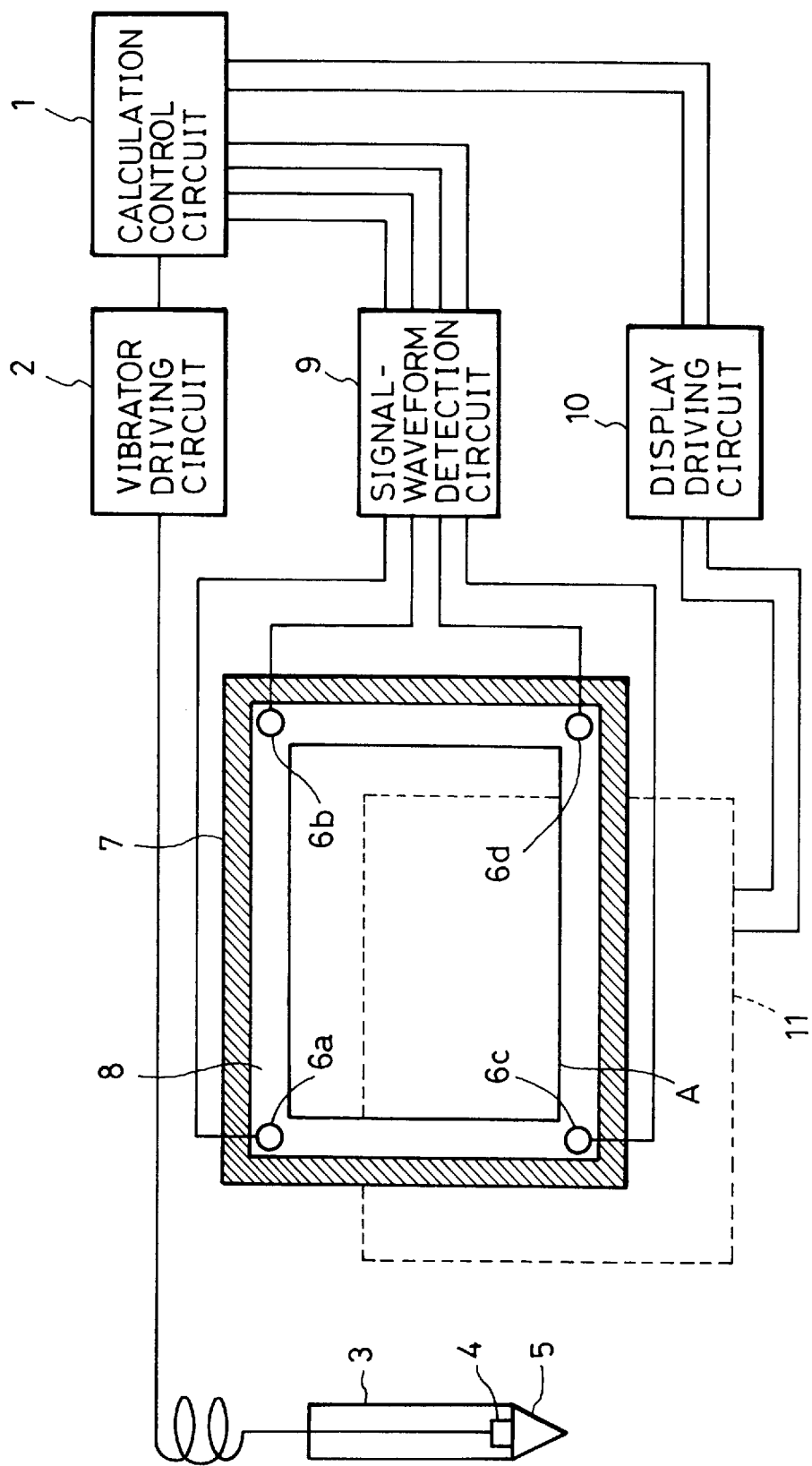
FIG. 2 is a block diagram of a conventional coordinate input apparatus.
Figure 3:
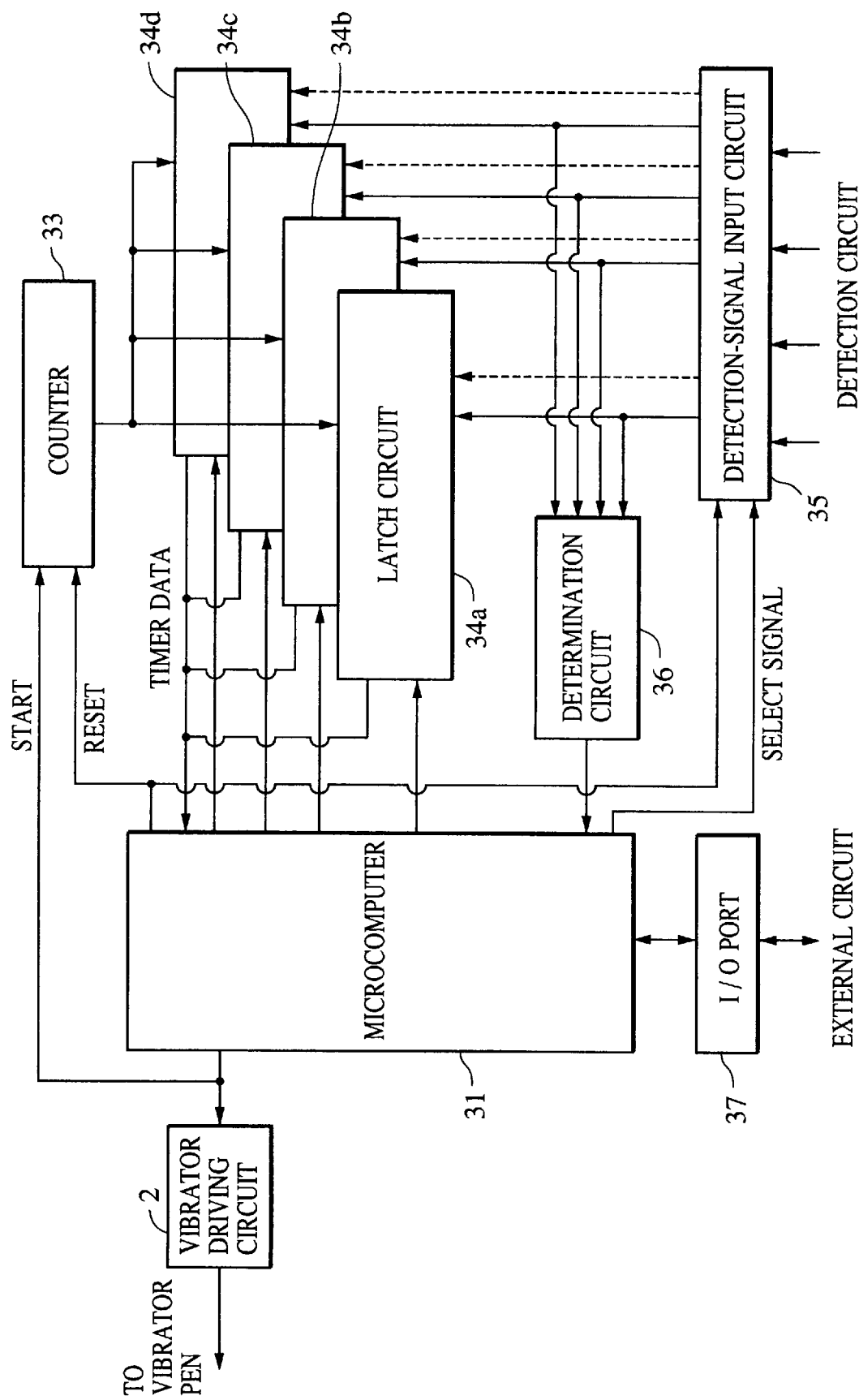
FIG. 3 is a view showing an internal configuration of the calculation control circuit shown in FIG. 2.
Figure 4:
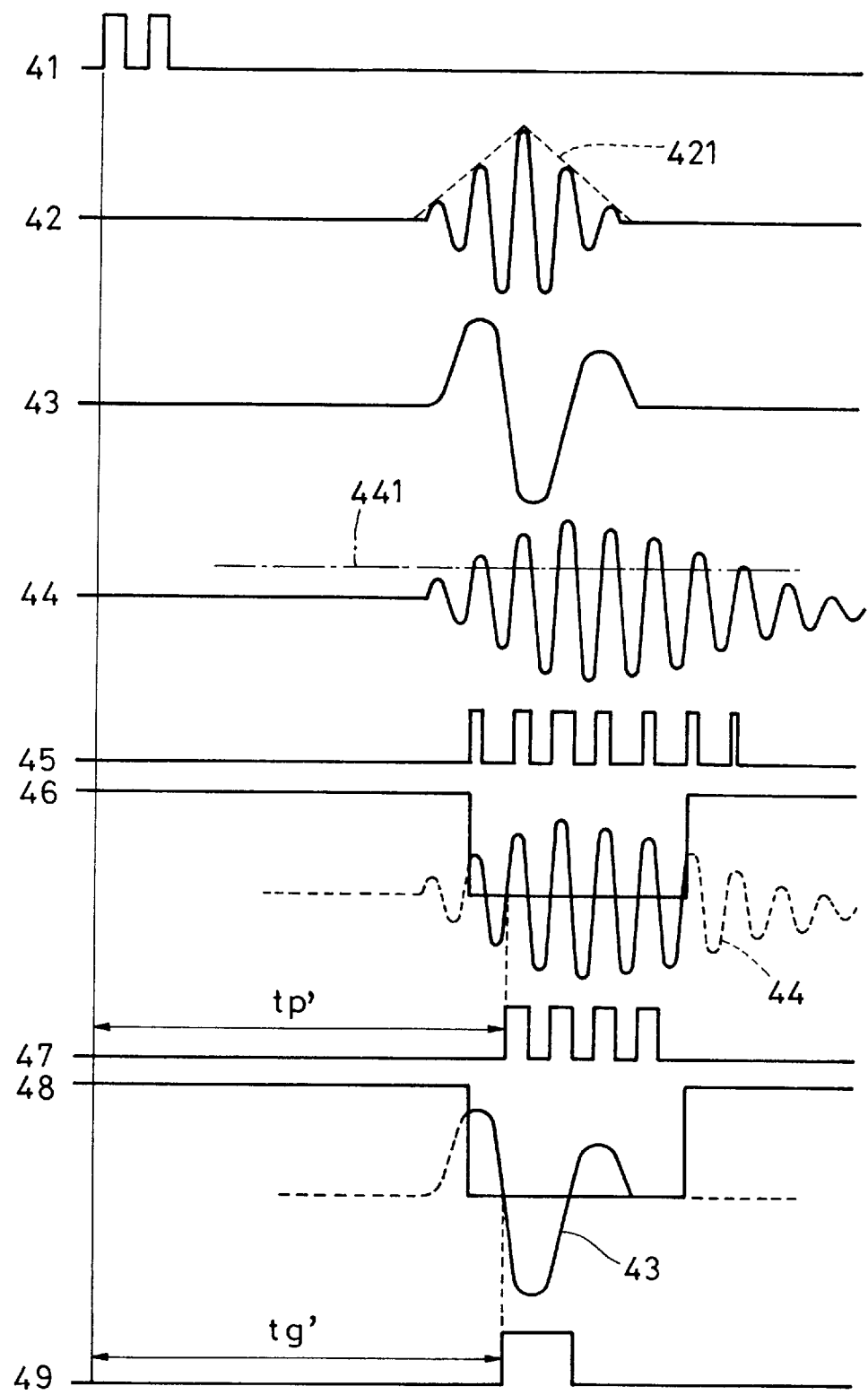
FIG. 4 is a timing chart of a conventional signal processing.
Figure 5:
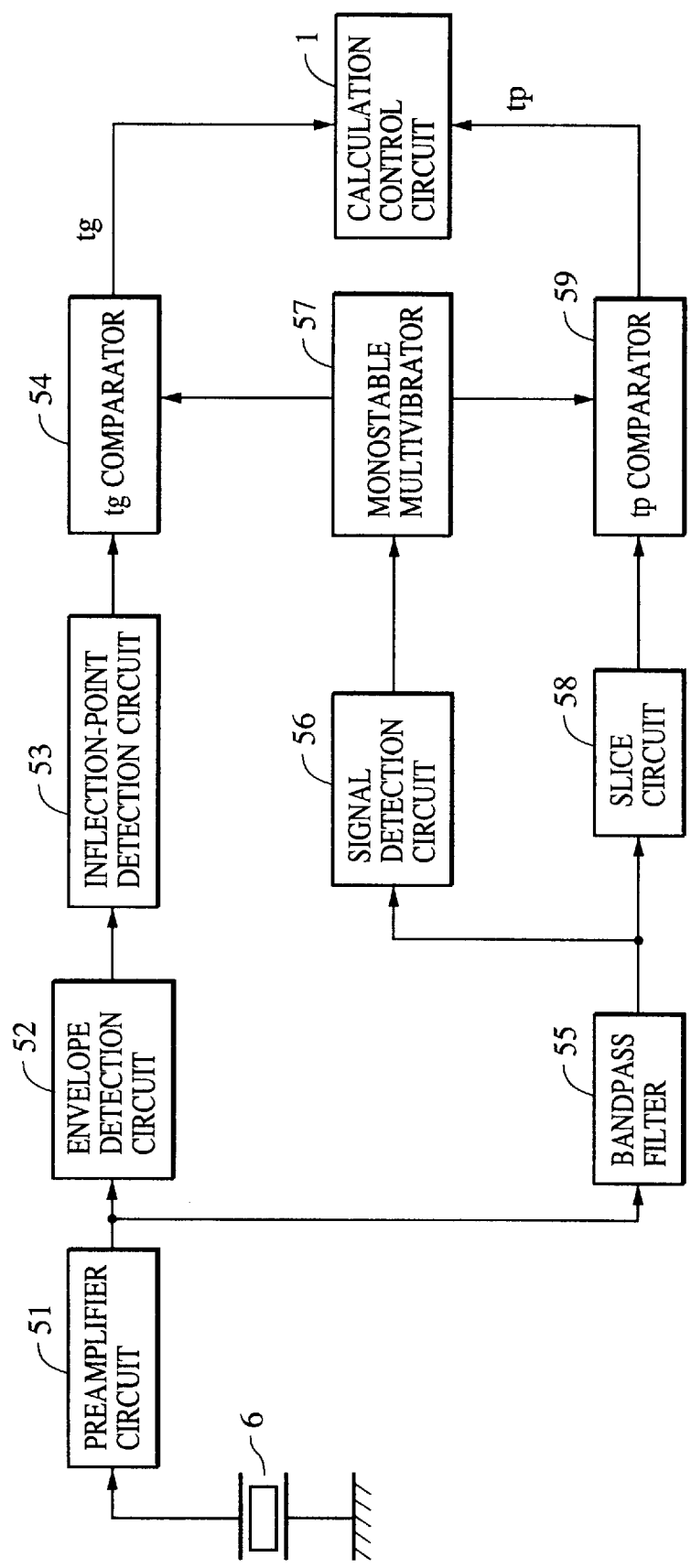
FIG. 5 is a block diagram showing a conventional signal-waveform detection circuit.
Figure 6:
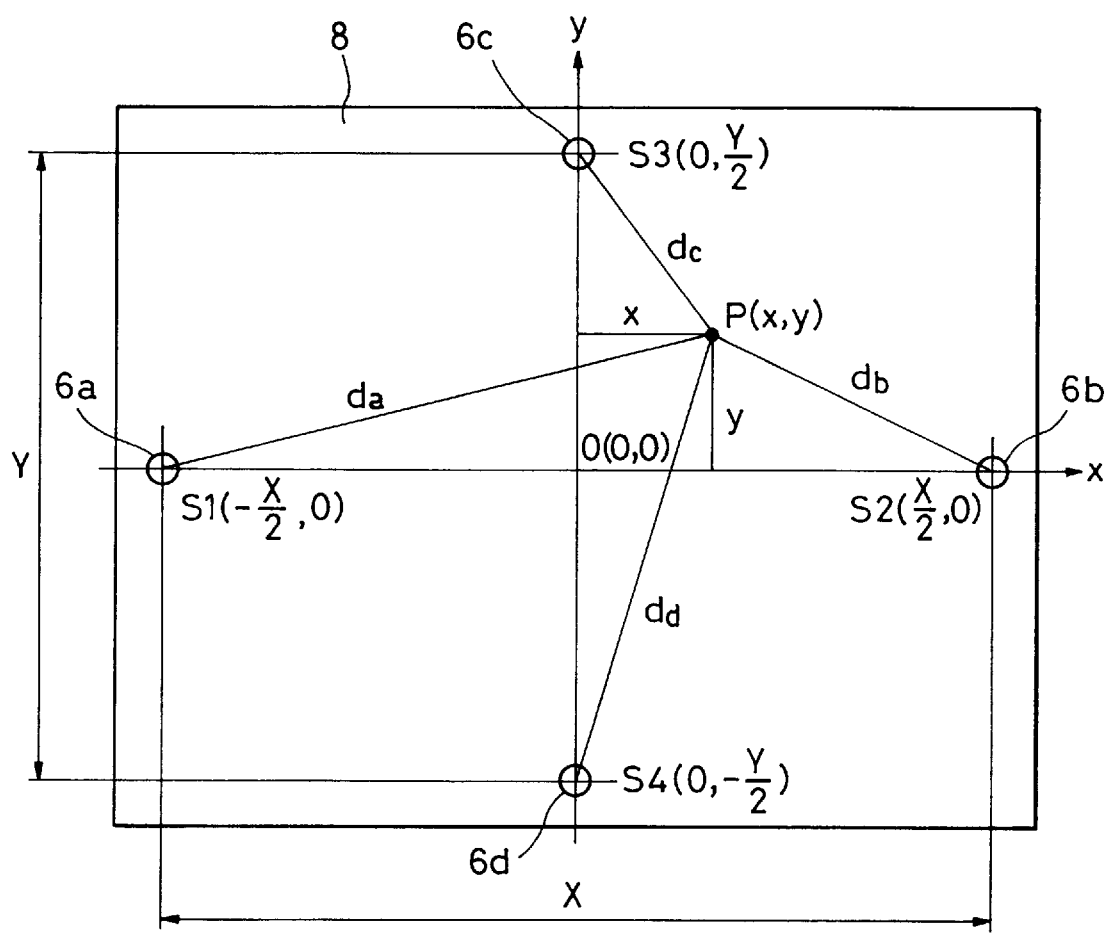
FIG. 6 is a view showing the coordinate system of a coordinate input apparatus.
Figure 7:
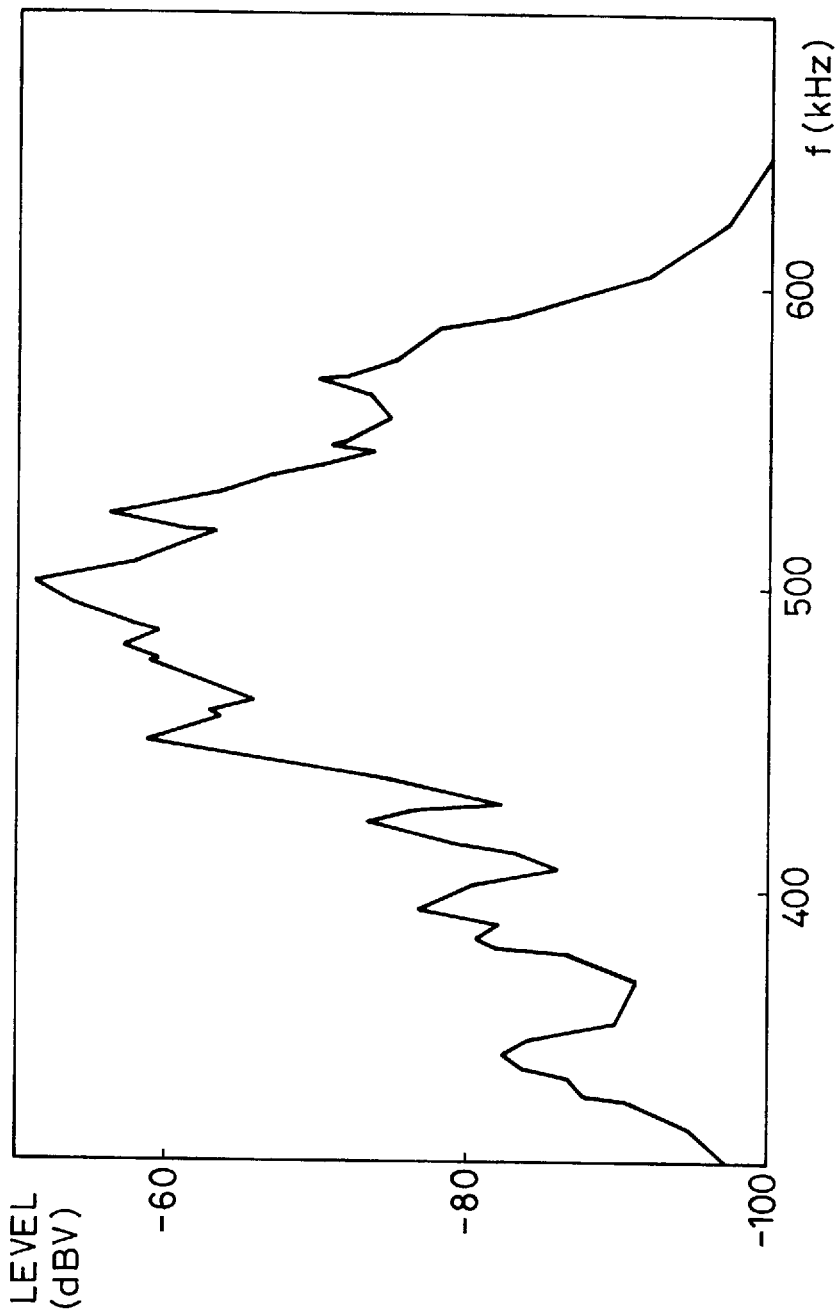
FIG. 7 is a view illustrating the frequency characteristics of a detected signal.
Figure 8B:
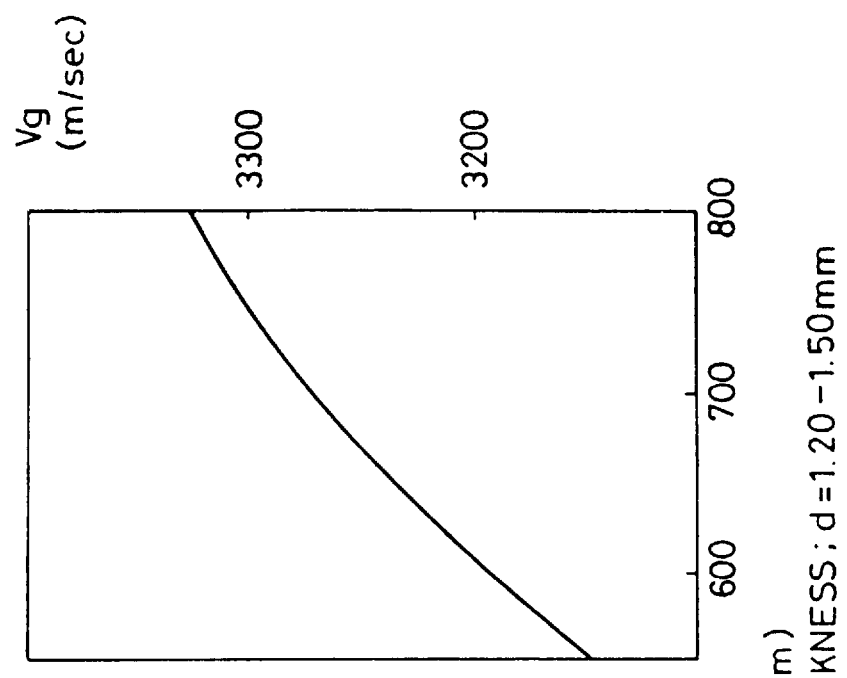
FIG. 8 (consisting of FIG. 8A and 8B) is a view illustrating the frequency characteristics of the transfer speeds of lamb wave.
Figure 8A:
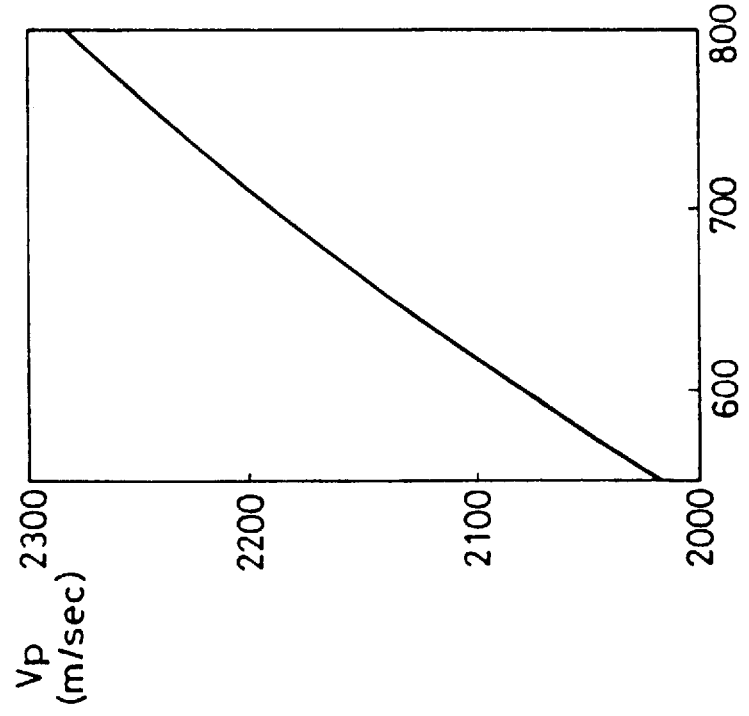
Figure 12:
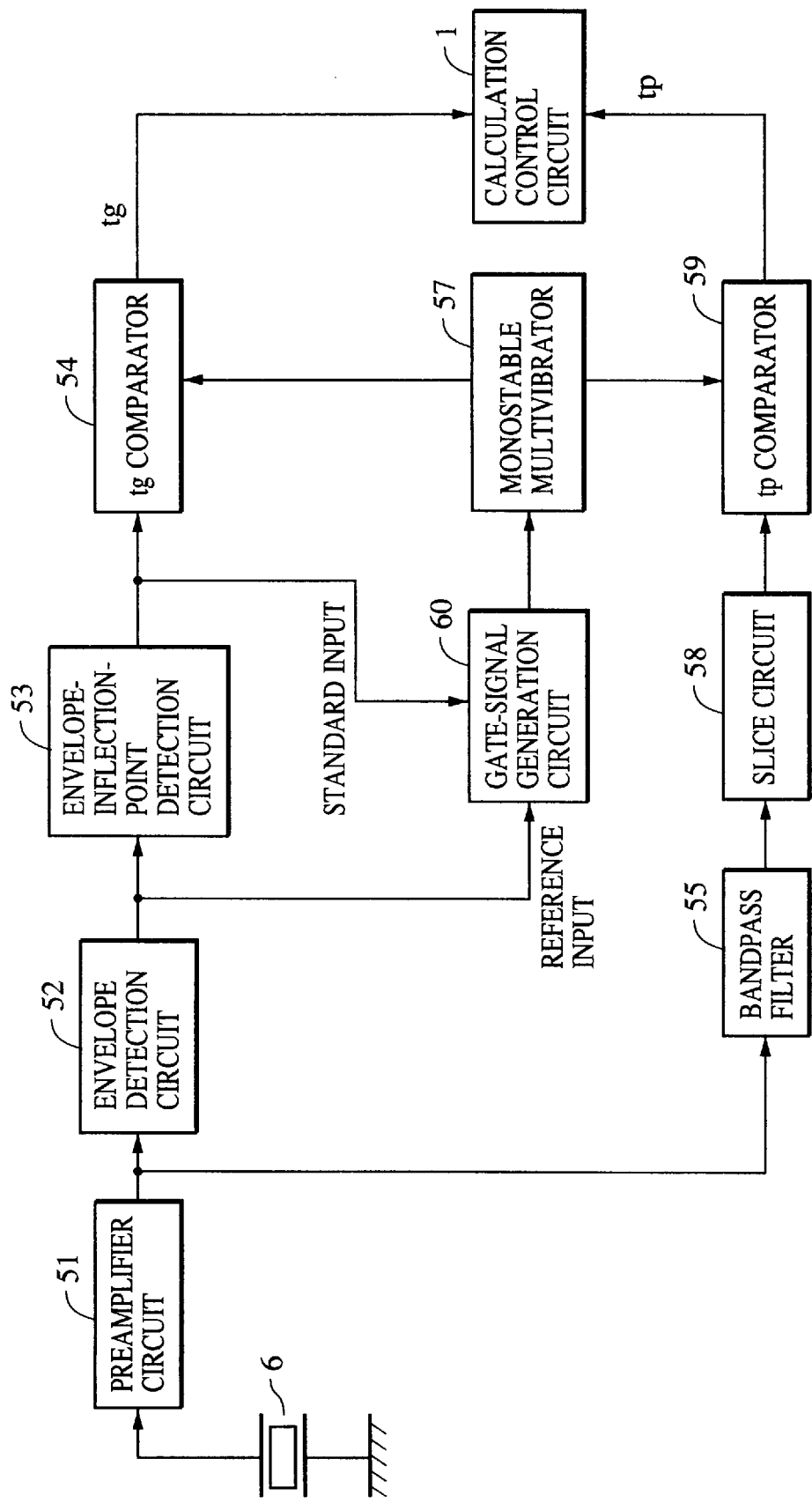
FIG. 12 is a block diagram of a conventional signal-waveform detection circuit.
Figure 14:
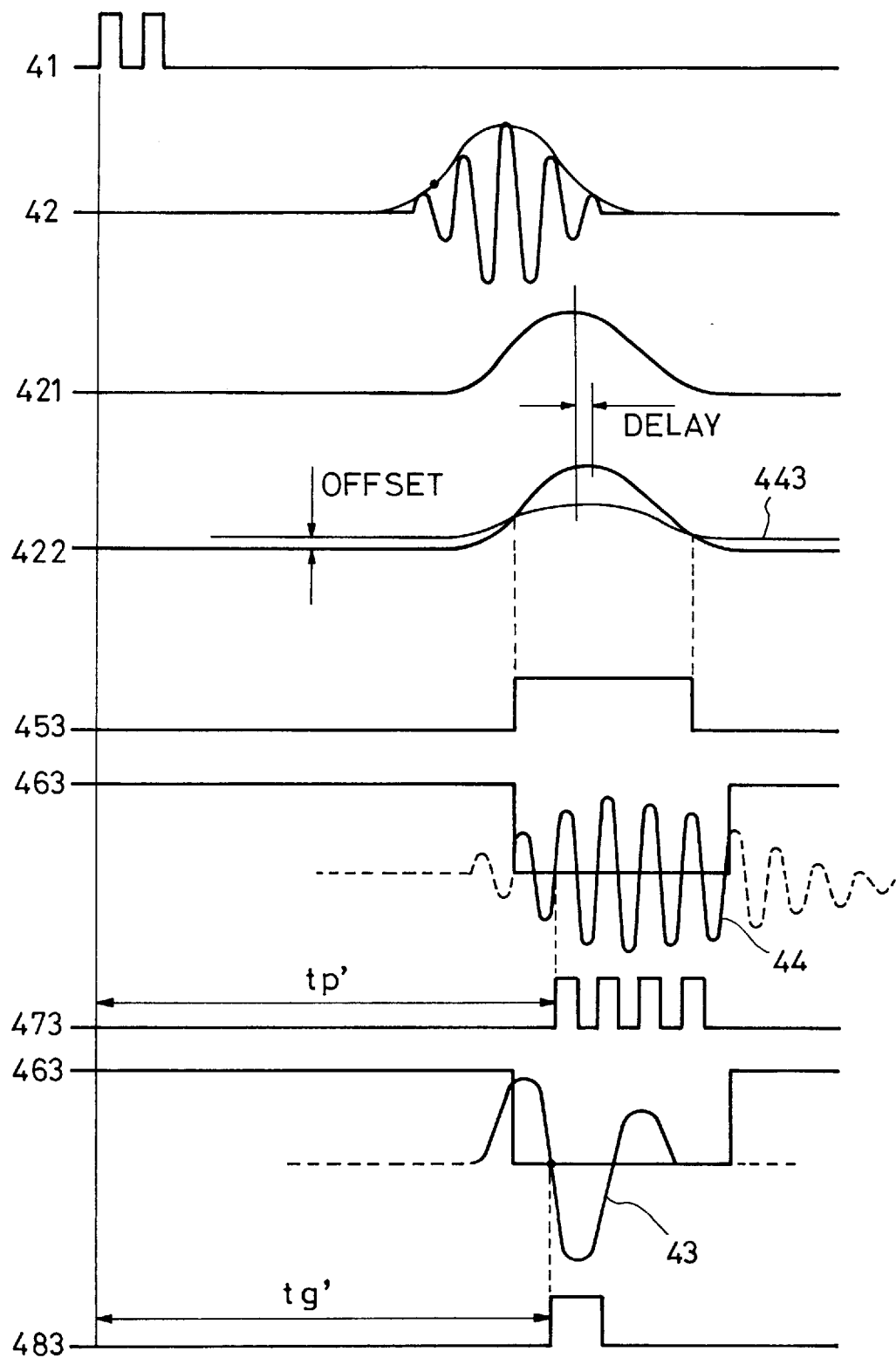
FIG. 14 is a timing chart of waveform processing according to an embodiment of the present invention.

FIG. 1 shows a configuration of the signal-waveform detection circuit of a coordinate input apparatus according to an embodiment of the present invention. By referring to the waveform processing procedure shown in FIG. 14, the principle for measuring a vibration transfer time in the present embodiment (FIG. 1) will be described below. The description is given to one vibration sensor 6. The same processing applies to the other sensors. Coordinates are obtained from the calculated distance between the vibrator pen and each vibration sensor in the same way as in the conventional technique.

Vibration generated by a drive signal 41 is detected by a vibration sensor 6. Signal 42 shown in FIG. 14 indicates the signal amplified by a preamplifier after the vibration sensor detects the vibration. With the drive signal 41 having short two pulses, the signal obtained is short in time. This is to prevent erroneous detection caused by interference (superposition) between unwanted reflected wave components inside the vibration transfer plate 8 (mainly at the end faces of the vibration transfer plate 8) and vibration to be detected, and to make the whole apparatus compact. Since the calculation processing for the group-delay time (tg) is susceptible to influences of reflected wave, detected signal 42 is used as is for detecting the envelope. To perform highly precise coordinate calculation as described above, the signal passing through a bandpass filter 55 is used for extracting the phase-delay time (tp). The time period from the drive timing to the certain detection point in phase signal 44 (a certain zero-crossing point) is indicated by tp', and the time period from the drive timing to the certain point in the envelope signal 421 (in the present embodiment, this point is the first zero-crossing point in the twice differentiated signal 43) is indicated by tg'.

The signal (twice-differentiated signal 43) obtained by differentiating twice the envelope signal, which is the input signal to the tg comparator 54, has disturbance noise mixed before vibration reaches, and it cannot be said that the signal is a constant zero-level signal. Therefore, to prevent a tg' signal being created erroneously by noise, it is preferable that the tg comparator 54 is idle until a vibration reaches. In the same way as when the gate signal of the conventional technique is used for tp' detection, gate signal 462 output from the monostable multivibrator 57 (in FIG. 1, a gate-signal generation circuit 60 and a monostable multivibrator 57 are indicated by the same block) is used for tg' detection. In other words, two vibration transfer times, tg' and tp', are calculated with the use of the gate signal.

The present embodiment features the opening of the gate signal, which is used for detecting the two special points stably. Operations of a gate-signal generation circuit 60 shown in FIG. 1 for generating the timing when the gate signal opens will be described by referring to FIG. 14. Envelope signal 421 output from an envelope detection circuit 52 is input to the gate-signal detection circuit 60 through a delay circuit 61 as a delay signal 422. At the same time, the envelope signal 421 is converted to a reference-level signal 443 by attenuating at the specified attenuation rate (D) and adding the specified offset voltage (+offset), and input to the gate-signal generation circuit 60. The gate-signal generation circuit 60 performs differential processing between the delay signal 422 and the reference-level signal 443 to generate a gate generation signal 453. A monostable multivibrator 57 outputs a gate signal 463 having the specified width at the timing when the input gate generation signal rises.

The tg comparator 54 and the tp comparator 59 perform the same waveform processing as in the conventional apparatus. With this configuration, the gate signal opens at a constant timing irrespective of the detection level. The constant timing means that the gate opens at a certain time before the peak of phase signal 44. When the gate opens with the use of the conventional fixed threshold, if the level of the detection signal 42 of the vibration sensor 6 decreases, the gate signal is delayed. A zero-crossing point of the detected signal (phase waveform signal) 42 after the peak is regarded as tp'. In this case, if the writing force is small or the pen is held extremely slantingly, even when the same coordinates are input, an error in the calculated distance increases. When the detection point one after the specified one is used, an error is about 0.3 mm at a long distance according to an error in the calculated distance shown in FIG. 9. In the same way, if the writing force is large at a short distance, the detection point tp' one before the specified one is used. The error in this case is shown in FIG. 9. The first advantage of the present embodiment is that the error in the calculated distance becomes zero.

Figure 15:
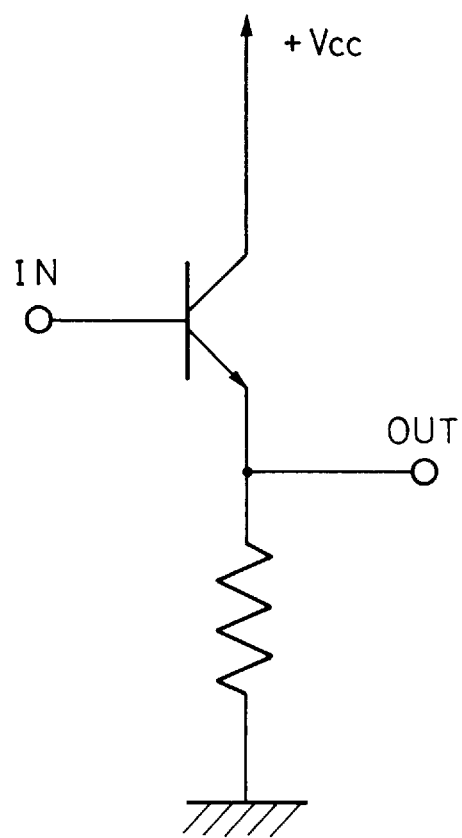
FIG. 15 is a view showing a configuration of a delay circuit.

FIG. 15 shows a configuration of a delay circuit 61. This delay circuit can be configured only with one transistor and one resistor and generates a delay time of about 1 µs for an input signal having a frequency of about 100 kHz. Since the delay circuit uses the transistor as an emitter follower, it has low output impedance and high input impedance, allowing it to be inserted at any point in a circuit.

Figure 16:
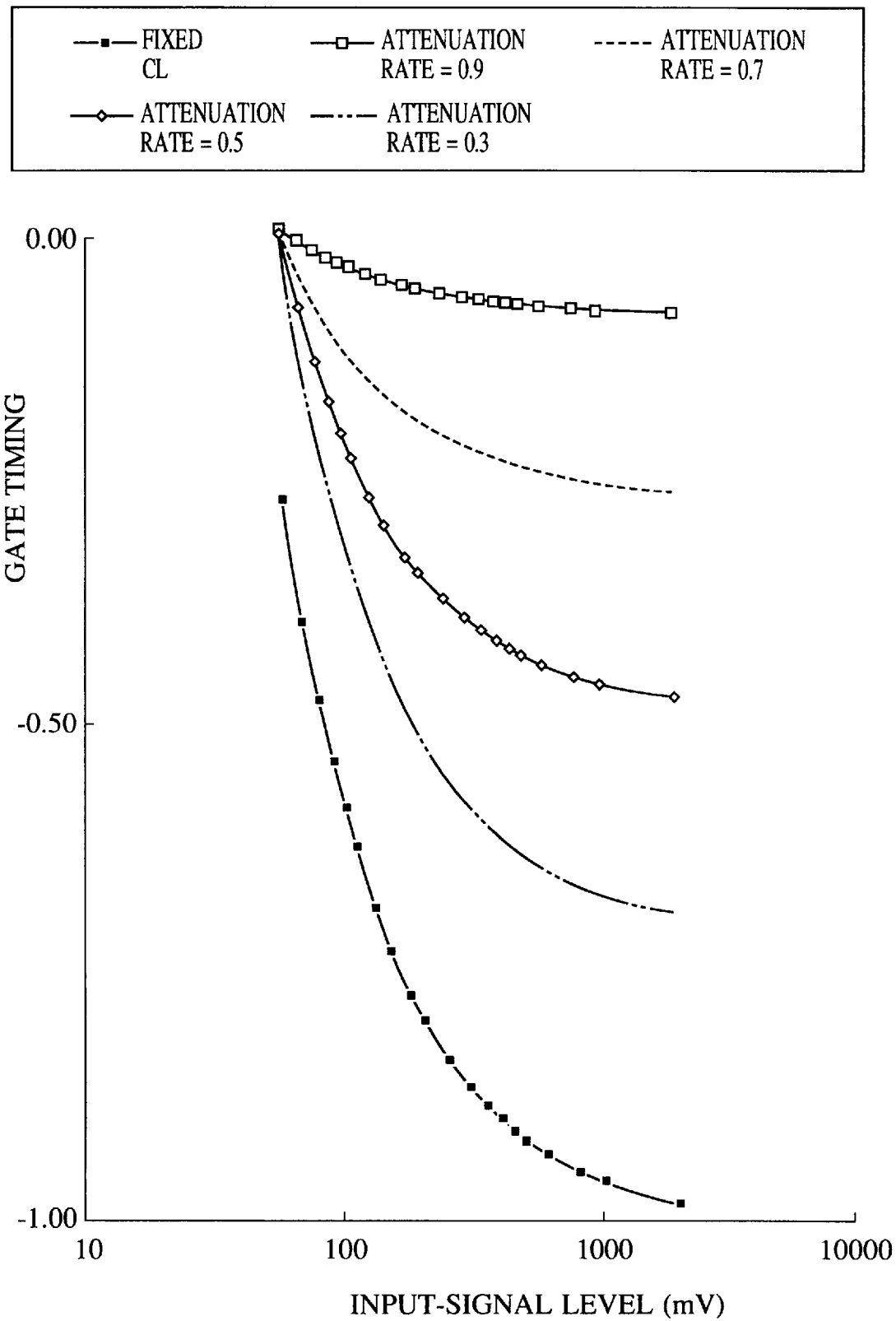
FIG. 16 is a view showing gate timing.

FIG. 16 shows the gate timing variations obtained when the attenuation rate is changed from 0.3 to 0.9 in the gate-signal generation means 60, for comparison with the conventional technique. In the figure, the horizontal axis indicates the peak value (amplitude) of the envelope signal 421 serving as an input signal. Since the delay time in the delay circuit 61 is 3.3 µs and the frequency of the rising waveform of the envelope signal 421 is about 60 kHz (the waveform, namely the frequency, changes according to the transfer distance), the delay amount corresponds to about 0.2 λ. The offset amount applied by the reference-level generation means 62 is set such that each minimum detectable amplitude is 50 mV. The reason why this amplitude is specified is to prevent the gate from opening due to noise mixed in the input signal. In the conventional technique, the amplitude is determined by electrical noise signals (such as radiated noise and power noise) and detection signals for vibration in spurious other modes.

The second advantage of the present embodiment is that common-mode noise can almost be ignored and electrical noise mixed in the delay signal 422 can be removed since the two signals (delay signal 422 and reference-level signal 443) having substantially the same waveform are used as differential inputs for gate generation. Therefore, it is only required that the gate be not opened due to vibration (transferring in the glass) in other modes.

The third advantage of the present embodiment is that the differential input voltages in the tg and tp comparators are not negative since the differential inputs for gate generation have substantially the same waveform. Therefore, a single power can be used for the comparators, offering advantages in energy saving and costs.

When the coordinate input apparatus is configured with mass production being taken into account, the largest noise-like vibration is caused by 0th-order symmetrical lamb wave (hereinafter called $S_0$ wave) (in coordinate calculation, 0th-order asymmetrical lamb wave is used, which is called $A_0$ wave). The $S_0$ wave reaches a level about 2% of the asymmetrical wave in some cases. Since this ratio changes depending on the angle the pen makes with the plate, the writing force, and the surface condition, the apparatus is designed with the worst value. In this embodiment, against the level, about 2 V, of the envelope signal 421 of the detected signal, the maximum level of the $S_0$ wave is set to 40 mV. With some margin added, the minimum detectable amplitude is set to 50 mV (in the figure, the maximum $S_0$ level=50 mV is indicated).

In FIG. 16, the vertical axis represents the gate timing. Value 0.00 indicates that the gate opens at the peak of the envelope signal, and value −1.00 indicates that the gate opens at the top of the rising edge of the signal. With the conventional comparison level (in the figure, fixed CL), the maximum gate-timing difference of 0.71 is generated according to the input level. As shown in the figure, the gate-timing variation differs substantially depending on the attenuation rate. The variation becomes the minimum with an attenuation rate of 0.9 and its variation is 0.1. A variation of 0.71 corresponds to two wavelengths or more in the configuration of the present embodiment (vibration frequency is 500 kHz). This means the tp detection point shifts two points. Since a variation of 0.25 corresponds to one wavelength, if a variation is about 0.2, the tp detection point does not shift.

Figure 17:
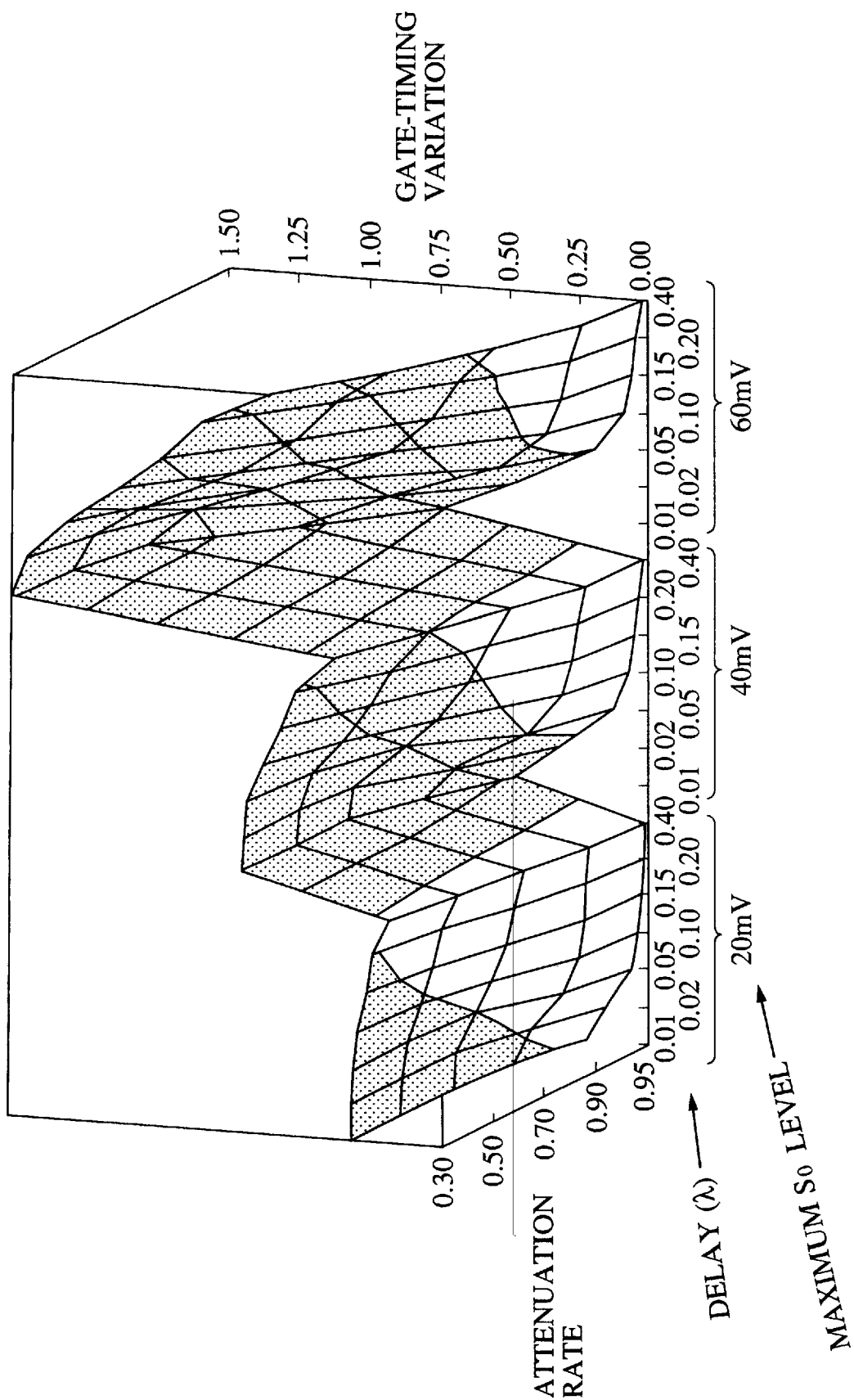
FIG. 17 shows the relationship between gate-timing variations, and the amounts of delay and other factors.

FIG. 17 shows the changes of the gate timing due to the offset and the delay, which are factors other than the attenuation rate. The x axis (horizontal axis) represents the delay and offset. As described above, the offset is determined by the maximum detection level for the $S_0$ wave. The actual offset differs depending on the attenuation rate. With the same noise margin, the larger the attenuation rate is, the offset needs to be set to smaller. The y axis (depth) represents the attenuation rate, and the z axis (vertical axis) represents the gate-timing variation, which is the difference between the maximum and the minimum values of the gate timing.

As understood from the figure, the timing variation changes largely depending on the maximum $S_0$ level. With the fixed CL, the gate-timing variation is 0.71, as described above. When the maximum $S_0$ level is 60 mV or more, it is understood that the gate-timing variation in this embodiment may worse than that with the fixed CL in some cases. In terms of actual manufacturing technologies, it is hardly evaluated that the $S_0$ level is 20 mV or less (the unwanted-vibration level is 2% or less in detection vibration mode). When the apparatus is designed with an $S_0$ level of about 40 mV, the delay and the attenuation rate need to fall in the area having no dots in FIG. 17 so as not to shift the tp detection point irrespective of the detection level (the variation <0.25). When the simple delay circuit 61 shown in FIG. 15 is used, since the delay is 1 μs, or 0.06 λ, it is preferred that the attenuation rate be 0.9 or more.

Figure 13:
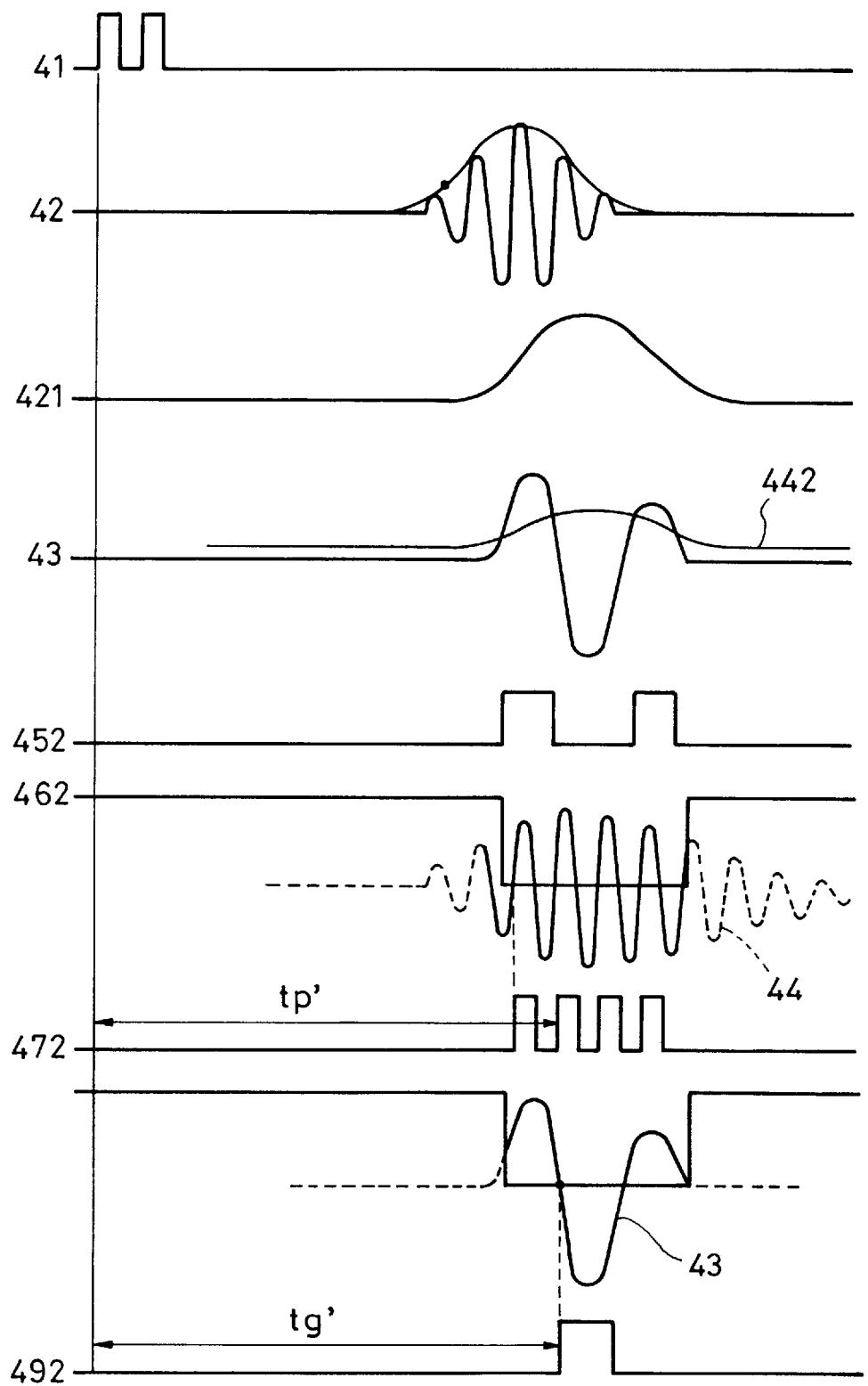
FIG. 13 is a timing chart of a conventional signal processing.

The longer the time width of the rising portion of the detected signal 42 becomes in FIG. 13, namely, the lower the frequency of the envelope signal 421 is, the larger the delay converted to a wavelength is. The attenuation rate can be reduced slightly. By enlarging the absolute value (time) of the delay (for example, plural stages of the circuit shown in FIG. 15 are used), the attenuation rate can also be reduced. The reason why it is preferred that the attenuation rate is small is that the offset becomes smaller as the attenuation rate is larger because the offset differs depending on the attenuation rate even when the maximum $S_0$ level is the same value, 40 mV. For example, when the attenuation rate is 0.9, the offset is 4 mV, and when the attenuation rate is 0.3, the offset is 28 mV. Although the present embodiment is immune to common-mode noise and is not susceptible to influences of almost all kinds of electric noise, which is one advantage of the present embodiment, as described above, a noise margin needs to be specified to some extent. This is because the vibration sensor 6 may directly receive electromagnetic noise (magnetic noise in many cases) or may detect vibration other than that from the vibrator pen 3. It is necessary to set a noise margin for cases in which some noise is received.

There is a limit to the delay converted to a wavelength. It is obvious that the time resolution decreases in time detection when the width of the detected signal 42 is widened. In the same way as in a supersonic scratch detector and a supersonic medical diagnosis device (echo type), it is preferred that the detected signal 42 be shorter in a supersonic-type coordinate input apparatus. This is to make the apparatus immune to influences of superposition of reflected wave, which is described above.

Figure 18:
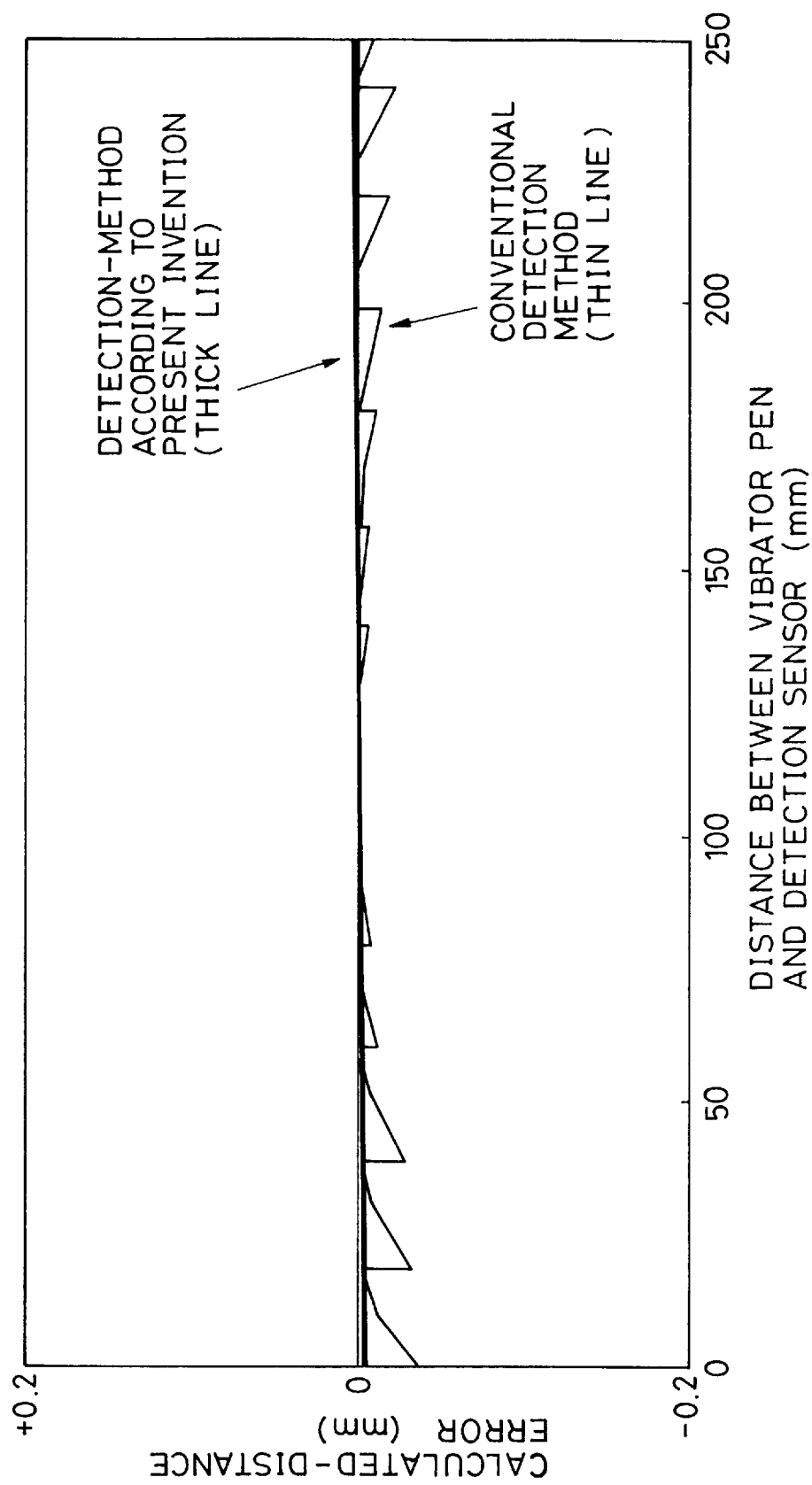
FIG. 18 is a view showing distance errors according to the present invention.

In a coordinate input apparatus having an input area of several hundreds of square millimeters with a certain degree of coordinate output precision, it is preferred that vibration have a frequency of about several hundreds of kilohertz (in this embodiment, 500 kHz is used). In this case, it has been found that, when the frequency of the envelope signal (at the rising portion) is about one seventh to one ninth that of vibration, the most short time width and high detection performance are provided. The settings for the optimum comparison level are described below at a vibration frequency of 500 kHz. In the signal-waveform detection circuit 9, a gate-timing variation of 0.22 was obtained with a delay of 0.06, the maximum $S_0$ level of 50 mV, and an attenuation rate of 0.9. FIG. 18 compares measurement errors in the calculated distance between the vibrator pen 3 and the vibration sensor 6, measured in the signal-waveform detection circuit 9 of the present embodiment, and those obtained with the conventional fixed CL (with the maximum gate-timing variation of 0.71).

In FIG. 18, calculated-distance errors with the conventional fixed CL are indicated with a thin line and those obtained in the present embodiment are indicated by a thick line. To facilitate this comparison, the vertical scale is slightly reduced, compared with that in FIG. 9. As shown in FIG. 10, since the detection level rapidly increases at a short distance (between the pen and the sensor) in the conventional method, the gate signal opens early. Before, after, and at the peak of the phase-waveform signal 44, the movements of the waveform specified points (zero-crossing points) in the time domain according to the distance differs. In other words, the specified point moves as if the phase speed Vp had differed. When tp' is positioned far before the peak (at the top) in a short distance, it has been found that distance errors shown in FIG. 18 take place. When in a long distance, errors having the opposite sign take place as shown in the figure.

As understood from FIG. 18, errors in the calculated distance rarely take place in the apparatus according to the present embodiment. The advantage of no change in the gate timing is superior.

Second Embodiment

Figure 19:
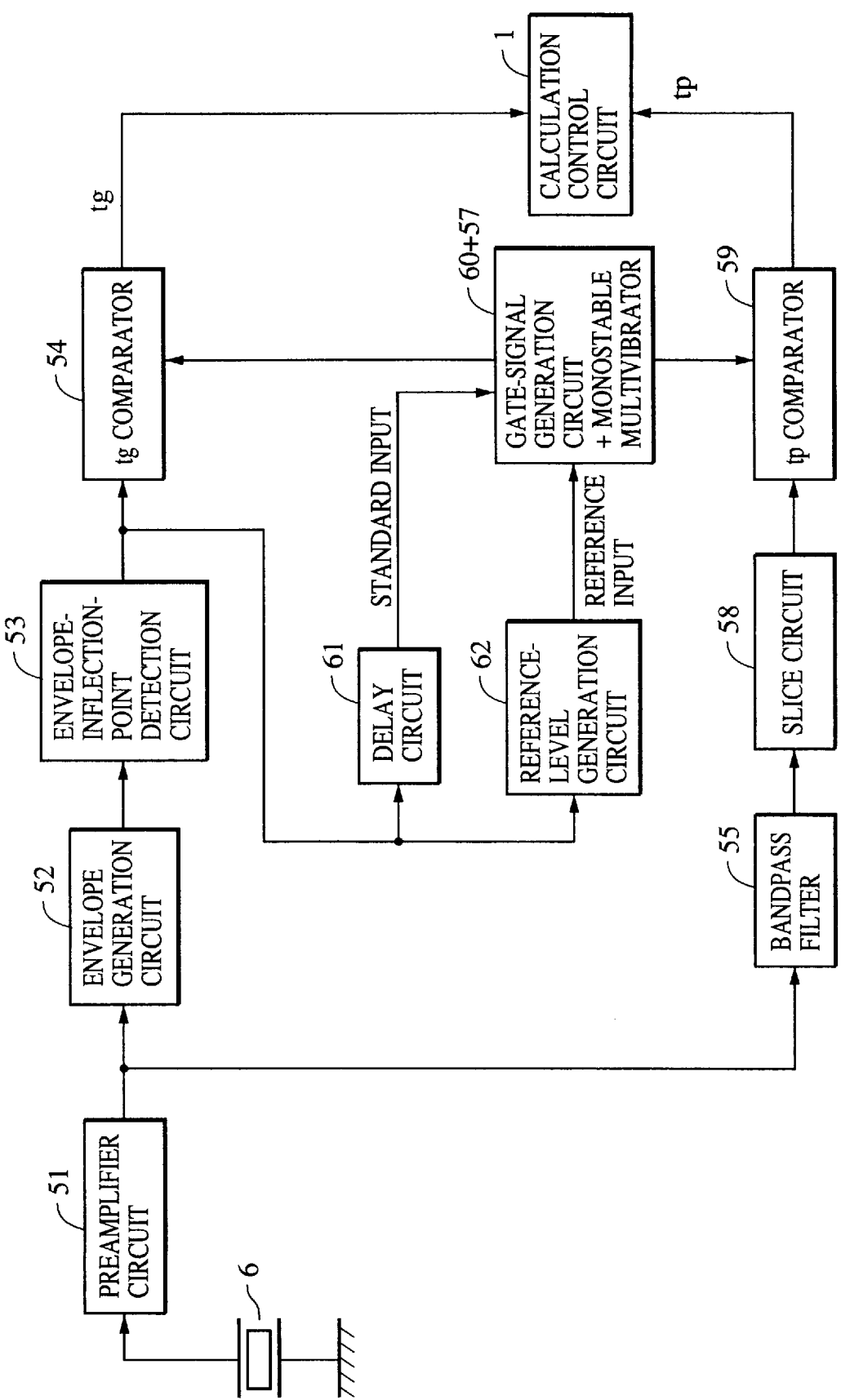
FIG. 19 is a block diagram of a signal-waveform detection circuit according to a second embodiment of the present invention.

FIG. 19 shows a configuration of the signal-waveform detection circuit of a coordinate input apparatus according to a second embodiment of the present invention. The other circuits are configured in the same way as in the first embodiment. In the second embodiment, a twice-differentiated signal 43 obtained by differentiating twice the signal output from an envelope-inflection-point detection circuit 53 is used as both a standard signal and a reference signal to create a gate signal. It is clear that the gate-timing variation can be suppressed in the same way as for the first embodiment when the same signal is used for gate generation. Since the twice-differentiated signal 43 has a higher frequency than an envelope signal 421, the delay converted to a wavelength becomes larger with the same delay, making the gate-timing variation shown in FIG. 17 small. Therefore, the attenuation rate can be set to lower than that in the first embodiment to enlarge the offset, offering an advantage of a large noise margin for the circuits.

Since the waveform of the twice-differentiated signal 43 at the rising portion is different from that of a sine wave, the gate timing slightly changes compared with that shown in FIG. 16 when the level is high. In this embodiment, with this phenomenon being taken into consideration, it is necessary to set the circuit constants of the inflection-point detection circuit 53 in order to make the change smaller. Since the inflection-point detection circuit 53 (differentiating circuit) has a higher gain in high frequencies than the envelope generation circuit 52, it is susceptible to influences of noise in the vibration-frequency band. It can be considered that the noise margin of the circuit is reduced.

Whichever is superior in the performance between the configuration shown in FIG. 1 and that shown in FIG. 19 can be selected according to the characteristics of the signal-waveform detection circuit, that is, the type and magnitude of the noise of each signal.

Instead of the twice-differentiated signal 43, a once-differentiated output signal may be used. The use of the detected signal 42 or the phase-waveform signal 44, however, is inappropriate in terms of the principle shown in FIG. 14.

Third Embodiment

Figure 20:
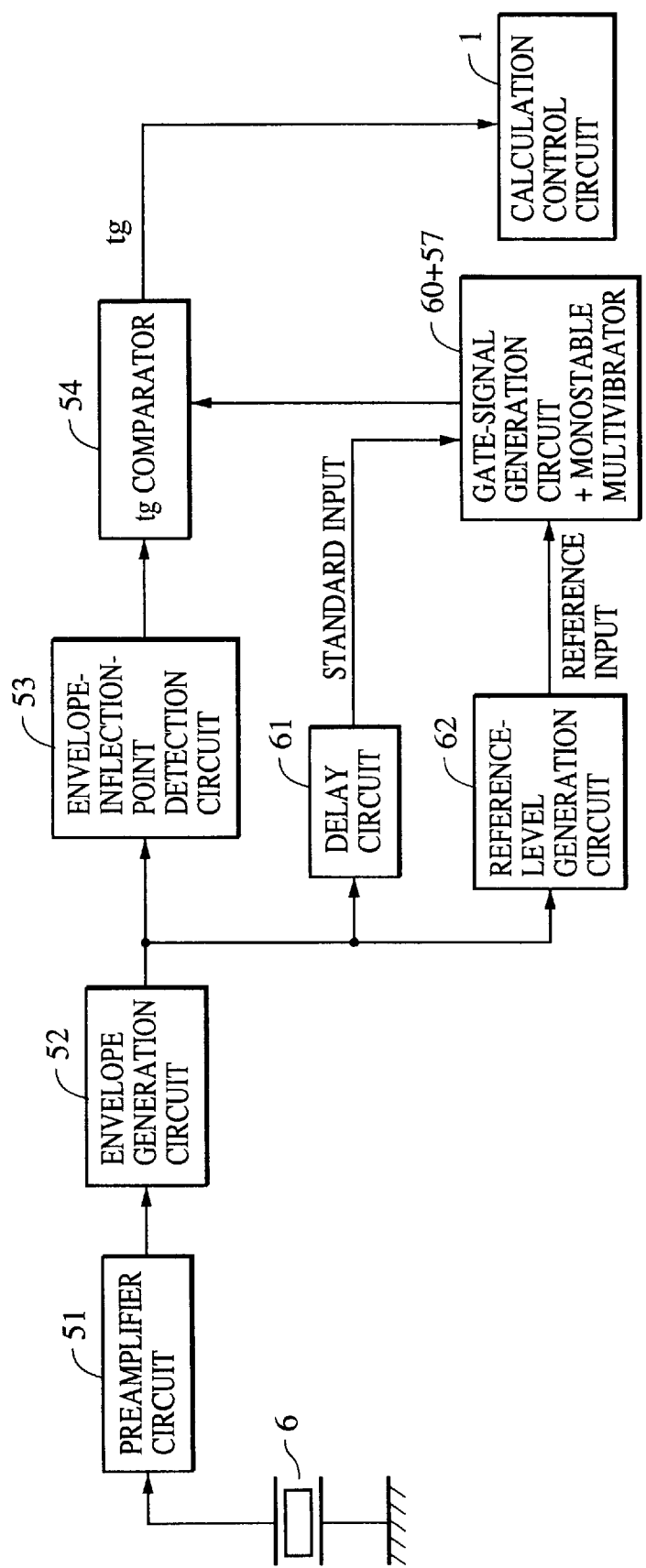
FIG. 20 is a block diagram of a signal-waveform detection circuit according to a third embodiment of the present invention.

FIG. 20 shows a configuration of the signal-waveform detection circuit of a coordinate input apparatus according to a third embodiment of the present invention. Unlike the configuration of the first embodiment, the third embodiment employs a group-delay time without using a phase delay, namely, calculates the distance to a vibration source using expression (1) and calculates the coordinates.

This embodiment has two advantages. One is that distance errors are suppressed compared with the distance-measurement principle using both the phase-delay time (tp) and the group-delay time (tg), since the gate-timing variation is small. The other is that the comparators operate with a single power since the apparatus is immune to influences of usual electrical noise due to generation of common-mode noise by using the same signal as differential inputs for gate generation. In addition, these advantages are obtained with a simple circuit configuration and there is no need to add a special waveform processing circuit.

If only the latter advantage is required, the configuration shown in FIG. 1 for the first embodiment is unnecessary, and the configuration shown in FIG. 20 is sufficient. In other words, when the distance is measured with the group-delay time (tg) only without using the phase-delay time, or when the distance is measured with expression (1), the present invention can apply.

The present invention can be applied to a coordinate input system comprising a plurality of units and also to a coordinate input system consisting of one unit. In addition, it is needless to say that the present invention can be applied to a coordinate input system or a coordinate input apparatus to which a program is supplied.

As described above, according to the present invention, an always stable, highly precise coordinate input apparatus having a simple configuration is provided even if the detection-level change due to the vibration transfer distance increases as the effective area increases, even if electrical noise (such as radiated noise and power noise) increases, or even if the detection level changes as the user holds the pen differently (the angle the pen makes with the plate) or the user applies the writing force differently.

What is claimed is:

1. A coordinate input apparatus for calculating and outputting the coordinate position directed by a vibration input pen for causing a vibration on a vibration transfer plate, according to said vibration transfer plate and a delay time detected at a plurality of points by vibration sensors from the vibration input onto said vibration transfer plate by said vibration input pen, said coordinate input apparatus comprising:

standard-signal outputting means for outputting a standard signal according to a signal output from said vibration sensors;

reference-signal generating means for converting said standard signal to a reference signal by attenuating said standard signal at a specified attenuation rate and adding a specified offset;

time-difference generating means for generating a relative time difference between said standard signal and said reference signal;

gate-signal outputting means for outputting a gate signal by detecting a portion where said standard signal having a time difference caused by said time-difference generating means exceeds said reference signal;

first measuring means for measuring a group-delay time according to a delay speed of said vibration by detecting a specified point of the detected signal during a period of said gate signal and by using said specified point as a reference; and providing means for providing the position coordinates of the vibration input pen according to said group-delay time measured by said first measuring means.

2. A coordinate input apparatus according to claim 1, further comprising a second measuring means for measuring a phase-delay time according to a phase speed of said vibration with a zero-crossing point of said detected signal during the period of said gate signal being used as the reference, wherein said providing means provides the position coordinates of the vibration input pen according to a vibration transfer time based on the group speed measured by said first measuring means and a vibration transfer time based on the phase speed measured by said second measuring means.

3. A coordinate input apparatus according to claim 1, wherein said specified offset added by said reference-signal generating means is determined according to the attenuation rate of said reference-signal generating means and a maximum detection level of vibration in mode other than that of the vibration detected by said vibration sensors, the attenuation rate exceeding 0.8, and said time-difference generating means comprises an emitter-follower transistor.

4. A coordinate input apparatus according to claim 1, wherein said standard-signal outputting means has means for detecting an envelope of a signal detected by said vibration sensors and said standard signal is the signal of said envelope.

5. A coordinate input apparatus according to claim 1, wherein said standard-signal outputting means has means for detecting an envelope of a signal detected by said vibration sensors and means for detecting inflection points of said envelope, and said standard signal is the signal indicating the inflection points of said envelope.

6. A coordinate input apparatus for calculating and outputting the coordinate position where elastic-wave vibration is input on a vibration transfer plate, according to said vibration transfer plate and a delay time of said elastic-wave vibration detected by vibration sensors, said coordinate input apparatus comprising:

converting means for converting to a level signal by attenuating an envelope of a detected signal detected by said vibration sensors and adding a specified offset;

delaying means for delaying the envelope of the detected signal detected by said vibration sensors; and generating means for generating a gate signal by comparing the level signal obtained by said converting means and a signal obtained by said delaying means.

7. A coordinate input apparatus according to claim 6, wherein said generating means generates the gate signal by detecting a portion where the signal obtained by said delaying means exceeds the level signal obtained by said converting means.

8. A coordinate input apparatus according to claim 6, further comprising first measuring means for measuring a delay time according to the speed of said elastic-wave vibration by detecting a specified point of said detected signal during a period of said gate signal and by using said specified point as a reference.

9. A coordinate input apparatus according to claim 8, further comprising providing means for providing the position coordinates of vibration input means according to the delay time measured by said first measuring means.

10. A coordinate input apparatus according to claim 9, further comprising second measuring means for measuring a phase-delay time according to a phase speed of said vibration with a zero-crossing point of said detected signal during the period of said gate signal being used as the reference, wherein said providing means provides the position coordinates of said vibration input means according to a vibration transfer time based on a group speed measured by said first measuring means and a vibration transfer time based on the phase speed measured by said second measuring means.

11. A coordinate input apparatus according to claim 6, wherein said specified offset added by said converting means is determined according to an attenuation rate of said converting means and a maximum detection level of vibration in mode other than that of the vibration detected by said vibration sensors, the attenuation rate exceeding 0.8, and said delaying means comprises an emitter-follower transistor.

12. A method for calculating and outputting the coordinate position directed by a vibration input pen causing a vibration on a vibration transfer plate, according to the vibration transfer plate and a delay time detected at a plurality of points by vibration sensors from the vibration input onto the vibration transfer plate by the vibration input pen, said method comprising the steps of:

first, outputting a standard signal according to a signal output from the vibration sensors;

converting the standard signal to a reference signal by attenuating the standard signal at a specified attenuation rate and adding a specified offset;

generating a relative time difference between the standard signal and the reference signal;

second, outputting a gate signal by detecting a portion where the standard signal having a time difference caused by the time-difference generated in said generating step exceeds the reference signal;

first measuring a group-delay time according to a delay speed of the vibration by detecting a specified point of the detected signal during a period of the gate signal and by using the specified point as a reference; and providing the position coordinates of the vibration input pen according to the group-delay time measured in said first measuring step.

13. A method according to claim 12, further comprising a second measuring step for measuring a phase-delay time according to a phase speed of the vibration with a zero-crossing point of the detected signal during the period of the gate signal being used as the reference, wherein said providing step includes providing the position coordinates of the vibration input pen according to a vibration transfer time based on the group speed measured in said first measuring step and a vibration transfer time based on the phase speed measured in said second measuring step.

14. A method according to claim 12, wherein the specified offset added in said generating step is determined according to the attenuation rate of said generating step and a maximum detection level of vibration in a mode other than that of the vibration detected by the vibration sensors, the attenuation rate exceeding 0.8.

15. A method according to claim 12, wherein said first outputting steps includes detecting an envelope of a signal detected by the vibration sensors, and wherein the standard signal is the signal of the envelope.

16. A method according to claim 12, wherein said first outputting step includes detecting an envelope of a signal detected by the vibration sensors and detects inflection points of the envelope, and wherein the standard signal is the signal indicating the inflection points of the envelope.

17. A method for calculating and outputting a coordinate position, wherein an elastic-wave vibration is input on a vibration transfer plate, according to the vibration transfer plate and a delay time of the elastic-wave vibration detected by vibration sensors, said method comprising the steps of:

converting a detected signal detected by the vibration sensors to a level signal by attenuating an envelope of the detected signal, and adding a specified offset;

delaying the envelope of the detected signal; and generating a gate signal by comparing the level signal obtained in said converting step and a signal obtained in said delaying step.

18. A method according to claim 17, wherein said generating step includes generating the gate signal by detecting a portion where the signal obtained in said delaying step exceeds the level signal obtained in said converting step.

19. A method according to claim 17, further comprising the step of measuring a delay time according to the speed of the elastic-wave vibration by detecting a specified point of the detected signal during a period of the gate signal and by using the specified point as a reference.

20. A method according to claim 19, further comprising the step of providing position coordinates of vibration input means according to the delay time measured in said measuring step.

21. A method according to claim 20, further comprising the step of measuring a phase-delay time according to a phase speed of the vibration with a zero-crossing point of the detected signal during the period of the gate signal being used as the reference, wherein said providing step provides the position coordinates of the vibration input means according to a vibration transfer time based on a group speed measured in said delay-time measuring step and a vibration transfer time based on the phase speed measured in said phase-delay time measuring step.

22. A method according to claim 17, wherein the specified offset added in said converting step is determined according to the attenuation rate used in said converting step and a maximum detection level of vibration in mode other than that of the vibration detected by the vibration sensors, the attenuation rate exceeding 0.8.

* * * * *